(12) United States Patent
Batchelder

(10) Patent No.: US 8,598,509 B2
(45) Date of Patent: Dec. 3, 2013

(54) OPTICAL ENCODER

(75) Inventor: J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 257 days.

(21) Appl. No.: 13/044,631

(22) Filed: Mar. 10, 2011

(65) Prior Publication Data

US 2011/0220781 A1    Sep. 15, 2011

Related U.S. Application Data

(60) Provisional application No. 61/312,737, filed on Mar. 11, 2010.

(51) Int. Cl.
*G01D 5/34* (2006.01)

(52) U.S. Cl.
USPC .......... 250/231.13; 250/231.14; 33/707; 341/13; 356/616

(58) Field of Classification Search
USPC ........... 250/231.13, 231.14, 231.16, 231.17, 250/231.18; 33/706, 707; 341/11, 13; 356/614, 616, 617, 619, 622
See application file for complete search history.

(56) References Cited

U.S. PATENT DOCUMENTS

| | | | |
|---|---|---|---|
| 3,618,074 A | 11/1971 | Brean et al. | 340/347 |
| 4,031,441 A | 6/1977 | Garrett | 318/480 |
| 4,479,347 A | 10/1984 | Larsen et al. | 56/344 |
| 4,672,201 A | 6/1987 | Welker | |
| 4,749,347 A | 6/1988 | Valavaara | 425/135 |
| 4,806,751 A | 2/1989 | Abe et al. | 250/231 |
| 4,979,827 A | 12/1990 | Matsui | 356/356 |
| 5,067,816 A | 11/1991 | Ichikawa | 356/373 |
| 5,303,141 A | 4/1994 | Batchelder et al. | 364/149 |
| 5,312,224 A | 5/1994 | Batchelder et al. | 415/73 |
| 5,426,722 A | 6/1995 | Batchelder | 395/80 |
| 5,590,059 A | 12/1996 | Schier | 364/559 |
| 5,671,052 A | 9/1997 | Kawakubo et al. | 356/373 |
| 5,764,521 A | 6/1998 | Batchelder et al. | 364/475.01 |
| 5,854,858 A | 12/1998 | Girod et al. | 382/250 |
| 6,021,171 A | 2/2000 | Andrews | 377/16 |
| 6,028,410 A | 2/2000 | Leavitt et al. | 318/568.15 |
| 6,085,957 A | 7/2000 | Zinniel et al. | 226/8 |
| 6,093,928 A * | 7/2000 | Ohtomo et al. | 250/231.13 |

(Continued)

FOREIGN PATENT DOCUMENTS

| | | |
|---|---|---|
| JP | 56118605 A | 9/1981 |
| WO | WO 2009/088995 A1 | 7/2009 |

OTHER PUBLICATIONS

International Search Report dated Nov. 17, 2011 from International Application No. PCT/US2011/027805, filed Mar. 10, 2011.

(Continued)

*Primary Examiner* — Kevin Pyo
(74) *Attorney, Agent, or Firm* — Brian R. Morrison; Westman, Champlin & Koehler, P.A.

(57) ABSTRACT

An optical encoder comprising a set of light sources configured to emit light rays in a serial manner, an encoded scale configured to reflect at least a portion of the emitted light rays, and a photodetector, where the photodetector is configured to detect at least a portion of the reflected light rays and to generate signals based on the detected light rays for each of the light sources.

20 Claims, 13 Drawing Sheets

(56) References Cited

U.S. PATENT DOCUMENTS

| | | | |
|---|---|---|---|
| 6,129,872 A | 10/2000 | Jang | 264/75 |
| 6,292,261 B1 | 9/2001 | Fishbaine et al. | 356/375 |
| 6,629,011 B1 | 9/2003 | Calderon et al. | 700/119 |
| 6,998,087 B1 | 2/2006 | Hanson et al. | 264/308 |
| 7,217,916 B2 | 5/2007 | Atsuta et al. | 250/231.13 |
| 7,352,304 B2 | 4/2008 | Tsuchiya et al. | 341/112 |
| 7,384,255 B2 | 6/2008 | LaBossiere et al. | 425/190 |
| 7,435,945 B2 | 10/2008 | Shimomura et al. | 250/231.13 |
| 7,470,892 B2 | 12/2008 | Ohmura et al. | 250/237 |
| 7,500,846 B2 | 3/2009 | Eshed et al. | 425/375 |
| 7,595,480 B2 | 9/2009 | Kress | 250/231.13 |
| 7,625,200 B2 | 12/2009 | Leavitt | 425/375 |
| 2004/0173736 A1 | 9/2004 | Atsuta et al. | |
| 2007/0228590 A1 | 10/2007 | LaBossiere et al. | 264/40.1 |
| 2007/0228592 A1 | 10/2007 | Dunn et al. | 264/40.4 |
| 2009/0035405 A1 | 2/2009 | Leavitt | 425/97 |
| 2010/0021580 A1 | 1/2010 | Swanson et al. | 425/132 |
| 2010/0100224 A1 | 4/2010 | Comb et al. | 700/118 |
| 2010/0283172 A1 | 11/2010 | Swanson | 264/80 |

OTHER PUBLICATIONS

International Search Report and Written Opinion dated Mar. 22, 2012 of Corresponding International Application No. PCT/US2011/027805, filed Mar. 10, 2011.

U.S. Appl. No. 12/976,111, filed Dec. 22, 2010.

\* cited by examiner

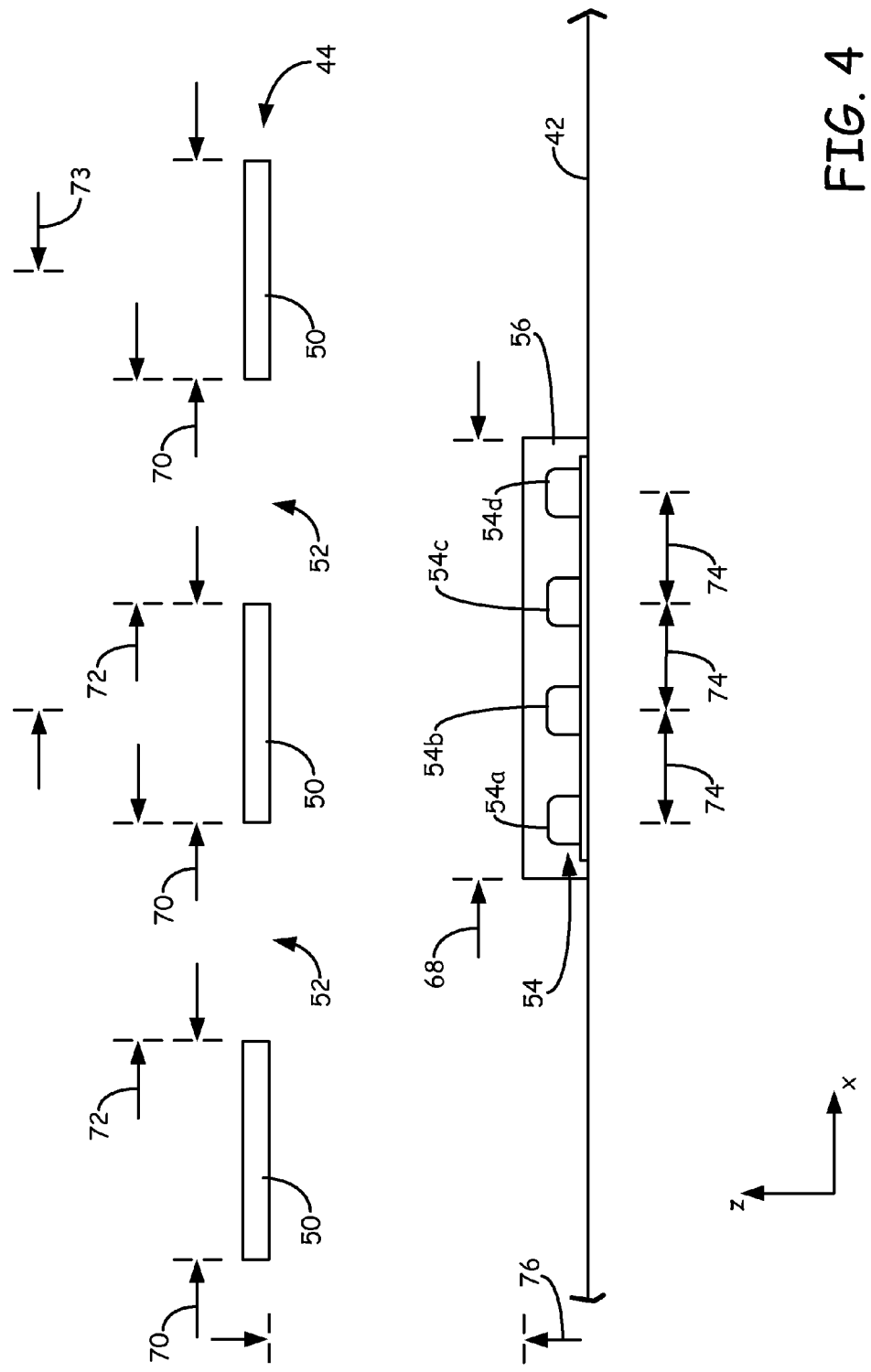

OPTICAL ENCODER

CROSS-REFERENCE TO RELATED APPLICATION(S)

This application claims priority to U.S. Provisional Patent Application No. 61/312,737, filed on Mar. 11, 2010, and entitled "INCRMENTAL OPTICAL ENCODER", the disclosure of which is incorporated by reference in its entirety.

BACKGROUND

The present disclosure is directed to motion and position sensors. In particular, the present disclosure is directed to optical encoders, such as rotary and linear optical encoders.

Rotary and linear encoders are used in a variety of industries for detecting mechanical motions and positions of different systems. For example, rotary encoders may be mounted to axles of drive motors to detect rotation of the axles. Such encoders are typically mechanical or optical in nature, where optical encoders use optical signals for motion and position detection.

Optical encodes are generally provided as either absolute encoders or incremental encoders. Absolute encoders include unique encoded patterns, where each pattern corresponds to a particular position be monitored. As such, absolute encoders are capable of detecting mechanical positions even after power loss. In comparison, incremental encoders use a non-unique repeated pattern for measuring relative changes in positions. As a result, incremental encoders are not capable of retaining positions after power losses, and typically require indexing upon power up. Nonetheless, incremental encoders are typically less expensive than absolute encoders, and constitute a vast majority of the mechanical and optical encoders in use.

SUMMARY

An aspect of the present disclosure is directed to an optical encoder that includes a set of at least four light sources configured to emit light rays in a serial manner, and an encoded scale. The encoded scale includes at least one reflective component and at least one non-reflective region, where the at least one reflective component is configured to reflect at least a portion of the emitted light rays. The optical encoder also includes a photodetector associated with the set of at least four light sources, where the photodetector is configured to detect at least a portion of the reflected light rays and to generate signals based on the detected light rays for each of the light sources. The optical encoder also includes a controller configured to determine an orientation of the encoded scale based at least in part of the generated signals.

Another aspect of the present disclosure is directed to an optical encoder that includes an encoder wheel, a photodetector, and at least four light sources configured to emit light rays in a serial manner toward the encoder wheel. The encoder wheel includes a plurality of alternating reflective spokes and non-reflective regions, where lengths of each of the reflective spokes and each of the non-reflective regions range from about 40% of a characteristic length of the photodetector to about 60% of the characteristic length of the photodetector. The at least four light sources are offset from each other by offset lengths ranging from about 15% of the characteristic length of the photodetector to about 35% of the characteristic length of the photodetector.

Another aspect of the present disclosure is directed to a method for operating an optical encoder. The method includes emitting light rays from each light source in a set of at least four light sources in a serial manner, and reflecting at least a portion of the light rays emitted from each of the light sources from an encoded scale. The method also includes detecting at least a portion of the reflected light rays with a photodetector associated with the set of at least four light sources, and generating signals based on the detected light rays for each of the light sources. The method further involves determining an orientation of the encoded scale based at least in part of the generated signals.

BRIEF DESCRIPTION OF THE DRAWINGS

FIG. 4 is a side view of the rotary optical encoder.

DETAILED DESCRIPTION

The present disclosure is directed to an optical encoder that is configured to measure the position and motion of components in a variety of different systems. The optical encoder includes an encoded scale (e.g., an encoder wheel or a linear scale) that is monitored with at least one photodetector and a plurality of light sources associated with each photodetector. The encoded scale desirably has a pitch (i.e., the distance between centers of adjacent spokes) that is proportional to a characteristic length of the photodetector. The light sources are configured to light up in a serial manner, where each light source is lit up one at a time, and portions of the light rays emitted from each light source reflect from the spokes of the encoded scale. The reflected light rays are then received by the associated photodetector to provide signal waves that are phase shifted from each other (e.g., quadrature signals). As discussed below, these signal waves may be used to measure the position and motion of components in an associated system with high resolution.

The optical encoder of the present disclosure may be used in a variety of different industrial and commercial applications. For example, embodiments in which the optical encoder exhibits a rotary encoder design, the optical encoder may be used in applications that require precise axle rotation, such as in the fields of industrial controls, imaging (e.g., photography, telescope astronomy, and video recording), radar platforms, robotics, computer numerical controlled (CNC) machining, direct digital manufacturing, and the like.

Figure 1:
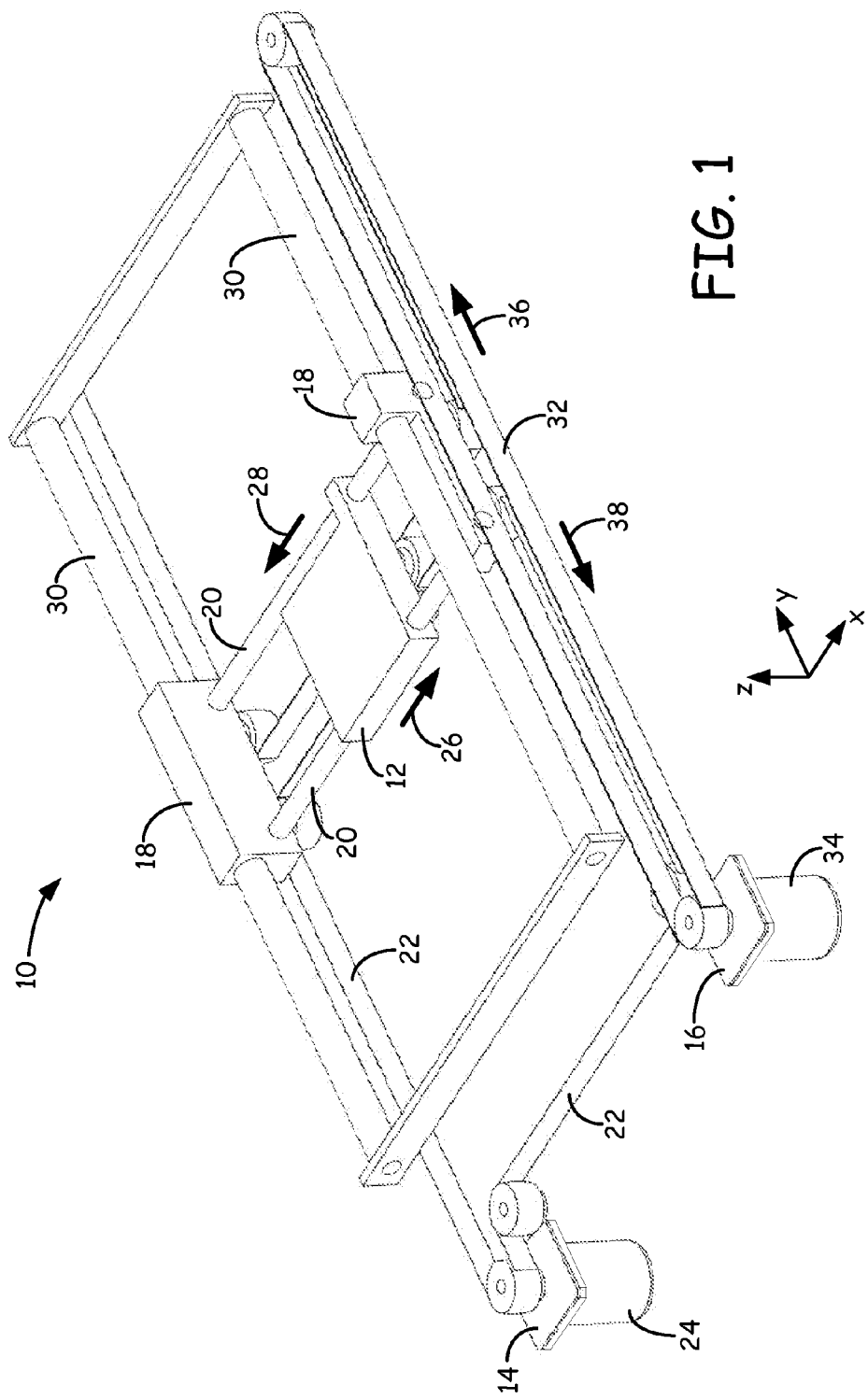
FIG. 1 is a perspective view of a gantry assembly, which contains rotary optical encoders of the present disclosure.

For example, as shown in FIG. 1, gantry 10 is a gantry assembly for moving tool 12 around in an x-y plane, and includes optical encoders 14 and 16 of the present disclosure for measuring the position and motion of tool 12. Tool 12 may be any suitable device for performing operations that require precise movement in the x-y plane. For example, tool 12 may be a deposition head for depositing one or more materials using a layer-based additive technique, such as in a deposition-based direct digital manufacturing system (e.g., fused deposition modeling systems developed by Stratasys, Inc., Eden Prairie, Minn.).

As shown, tool 12 is supported by carriage 18 with guides rails 20, where guide rails 20 limit the movement of tool 12 relative to carriage 18 to directions along the y-axis. Tool 12 also engages belt assembly 22, which moves tool 12 along the y-axis based on the rotation of an axle of drive motor 24. For example, when drive motor 24 rotates its axle in a first rotational direction, belt assembly 22 moves tool 12 along the y-axis in the direction of arrow 26. Alternatively, when drive motor 24 rotates its axle in a second opposing rotational direction, belt assembly 22 moves tool 12 along the y-axis in the direction of arrow 28, opposite of arrow 26.

Correspondingly, carriage 18 is supported by guide rails 30, which limit the movement of carriage 18 (and tool 12) to directions along the x-axis. Carriage 18 is also secured to belt assembly 32, which moves carriage 18 and tool 12 along the x-axis based on the rotation of an axle of drive motor 34. For example, when drive motor 34 rotates its axle in a first rotational direction, belt assembly 32 moves tool 12 along the x-axis in the direction of arrow 36. Alternatively, when drive motor 34 rotates its axle in a second opposing rotational direction, belt assembly 32 moves tool 12 along the x-axis in the direction of arrow 38, opposite of arrow 36.

Accordingly, the directions, velocities, acceleration and deceleration rates, and distances at which tool 12 moves along the y-axis and x-axis are determined by the rotational rates of the axles of drive motor 24 and 34, respectively. In the shown embodiment, optical encoder 14 is mounted to drive motor 24, and optical encoder 16 is mounted to drive motor 34. This arrangement allows optical encoders 14 and 16 to monitor the rotational rates and directions of the axles of drive motors 24 and 34, respectively. This allows the motion and direction of movement of tool 12 to be accurately monitored and controlled for use in processes that require high-precision positioning in the x-y plane.

Figure 2:
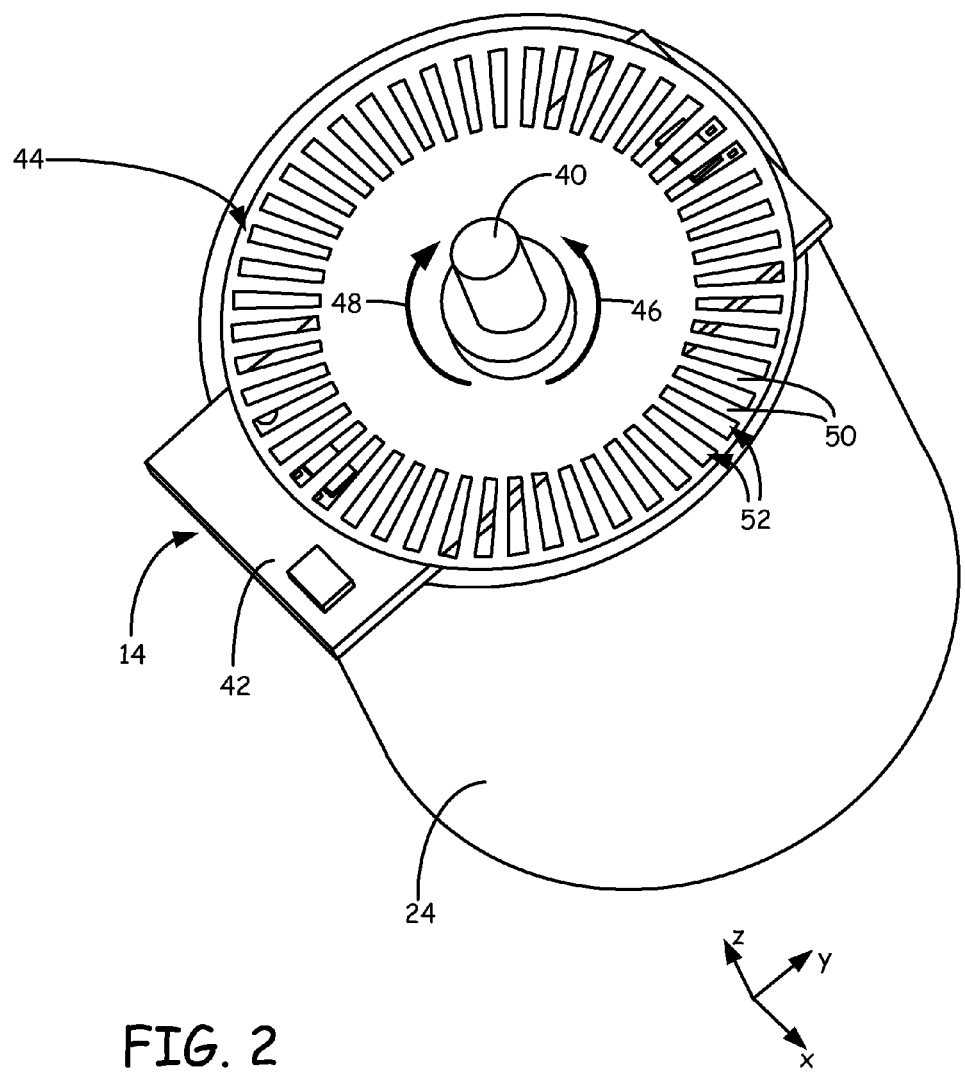
FIG. 2 is a top perspective view of a rotary optical encoder of the present disclosure in use with a drive motor.

FIG. 2 illustrates optical encoder 14 mounted to axle 40 of drive motor 24, where the housing component of optical encoder 14 is omitted for ease of discussion. The following discussion of optical encoder 14 may also apply to optical encoder 16 mounted to drive motor 34 in the same manner. In the shown embodiment, optical encoder 14 is a rotary optical encoder that includes circuit board 42 and encoder wheel 44, which are arranged as a reflection-based encoder. Circuit board 42 is mounted on or otherwise secured to drive motor 24, and, as discussed below, contains circuitry and optical instruments for detecting the position and movement of encoder wheel 44.

Encoder wheel 44 is secured to axle 40, thereby allowing encoder wheel 44 to rotate with the rotation of axle 40, such as in the rotational directions of arrows 46 and 48, which move tool 12 (shown in FIG. 1) along the y-axis in the directions of arrows 26 and 28 (shown in FIG. 1), respectively. Encoder wheel 44 includes a plurality of spokes 50 separated by gaps 52, where spokes 50 and gaps 52 are positioned to pass over the optical instruments of circuit board 34. As discussed below, this allows optical encoder 14 to monitor the rotation of axle 40, and correspondingly the motion of carriage 18 and tool 12 along the y-axis, by the positions and rotational velocities of spokes 50 and gaps 52.

Figure 3:
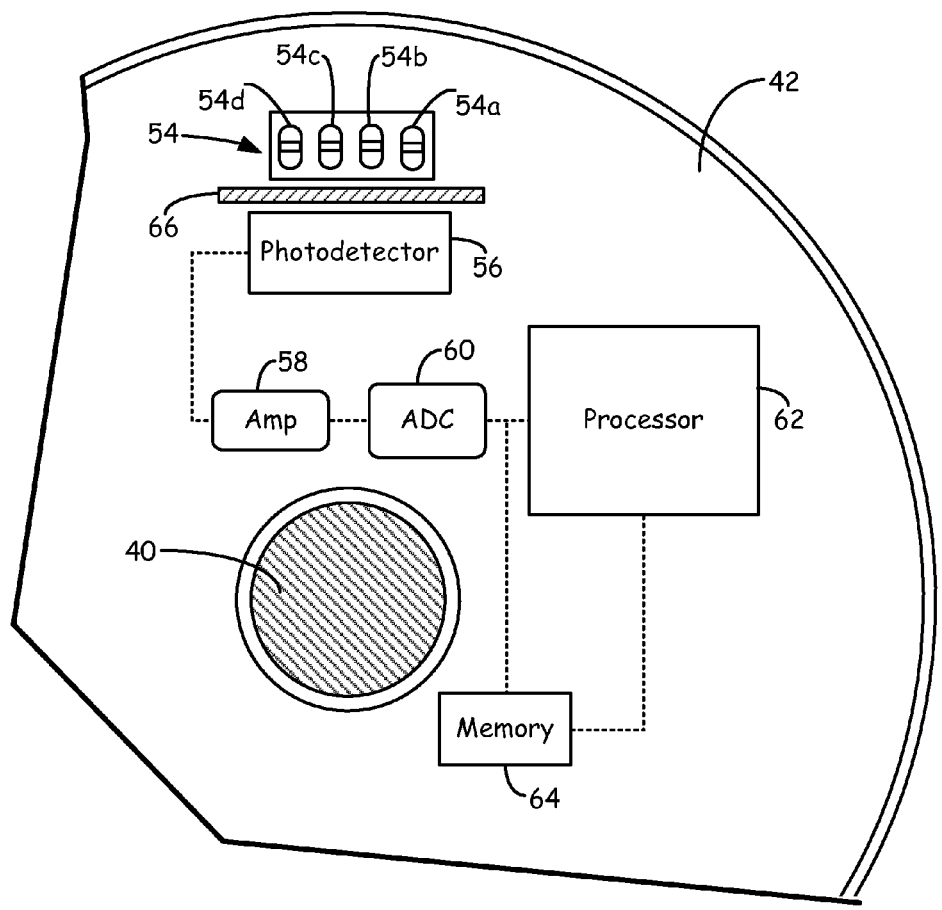
FIG. 3 is a front view of a circuit of the rotary optical encoder, which includes four light sources associated with a single photodetector.

FIG. 3 is a simplified illustration of circuit board 42, which includes light set 54, photodetector 56, preamplifier 58, analog/digital (A/D) channel 60, processor 62, and memory 64. Light set 54 includes LEDs 54a-54d, which are configured to emit light rays toward encoder wheel 44 (shown in FIG. 2) in a serial manner, where each LED is lit up one at a time in a repeating pattern. In one embodiment, the repeating pattern may follow an alternating order of LEDs 54a-54d, such as:

...→LED 54d→LED 54b→LED 54c→LED 54a→LED 54d→LED 54b→ . . .

In another embodiment, the repeating pattern may follow the sequential order of LEDs 54a-54d, such as:

...→LED 54d→LED 54a→LED 54b→LED 54c→LED 54d→LED 54a → . . .

In alternative embodiments, light set 54 may include a variety of different light sources in lieu of LEDs 54a-54d. Furthermore, light set 54 may include additional numbers of light sources (e.g., LEDs), where each light source desirably emits light in a manner that is phase shifted from adjacent light sources. Examples of suitable numbers of light sources for light set 54, associated with a single photodetector 56, include at least four, with particularly suitable numbers ranging from four to twelve, and with even more particularly suitable numbers ranging from four to eight. The use of at least four light sources (e.g., LEDs 54a-54d) allows optical encoder 14 to operate even with changes in reflectivity of spokes 50, stray light, power supply variations, and LED burn out.

As discussed below, a portion of the light rays emitted from LEDs 54a-54d reflect from spokes 50 of encoder wheel 44 toward photodetector 56, which generates a current based on the illumination intensity of the received light rays. The current generated by photodetector 56 is then amplified at preamplifier 58, and is sampled and digitized with A/D channel 60. The sampled data may then be relayed to processor 62 (e.g., as a voltage signal) for analysis with the use of memory 64, where memory 64 may be any suitable type of computer storage medium (e.g., block dynamic access memory).

As further shown in FIG. 3, circuit board 42 may also include barrier 66, which is desirably an opaque barrier that reduces or prevents the light rays emitted from LEDs 54a-54d from travelling directly toward photodetector 56. Accordingly, barrier 66 is desirably located between light set 54 and photodetector 56, and desirably has dimensions that prevent the light rays emitted from LEDs 54a-54d (or any alternative light sources) from travelling directly toward photodetector 56. In one embodiment, barrier 66 may extend entirely around the periphery of light set 54, thereby limiting the emission of light rays to directions toward encoder wheel 44. Additionally, barrier 66 may be fabricated from, or coated with, one or more materials that absorb light rays and/or reduce the scattering of light rays.

Circuit board 42 may also include a variety of additional components for monitoring encoder wheel 44. For example, in one alternative embodiment in which optical encoder 14 is a transmission-based encoder rather than a reflection-based encoder, circuit board 42 may be split into a pair of circuit boards located on opposing sides of encoder wheel 44. In this embodiment, light set 54 is desirably located on the opposing side of encoder wheel 44 from photodetector 56. This arrangement allows the light rays emitted from LEDs 54a-54d to transmit through gaps 52 of encoder wheel 44 toward photodetector 56. However, the use of a reflection-based encoder is beneficial for retaining the components on a side of a single circuit board (e.g., circuit board 42).

FIG. 4 is a side schematic view of optical encoder 14, illustrating light set 54 and photodetector 56, where barrier 66 is omitted for ease of discussion. As shown, photodetector 56 has a characteristic length in the direction of motion of encoder wheel 44 (referred to as length 68). In the shown embodiment, the "direction of motion" refers to a direction that is tangent to the rotational directions of encoder wheel 44. In alternative embodiments in which optical encoder 14 is a linear encoder rather than a rotary encoder, the "direction of motion" refers to directions parallel or colinear with the linear scale. Examples of suitable average dimensions for length 68 range from about 1.3 millimeters (about 50 mils) to about 6.4 millimeters (about 250 mils. In some embodiments, examples of suitable average dimensions for length 68 range from about 1.3 millimeters (about 50 mils) to about 5.1 millimeters (about 200 mils), with particularly suitable average dimensions ranging from about 2.5 millimeters (about 100 mils) to about 3.8 millimeters (about 150 mils).

Spokes 50 of encoder wheel 44 each desirably has the same length in the direction of motion of encoder wheel 44 (referred to as spoke length 70), and gaps 52 of encoder wheel 44 each desirably has the same length in the direction of motion of encoder wheel 44 (referred to as gap length 72). In one embodiment, spoke length 70 and gap length 72 are substantially the same. This provides a substantially constant pitch around encoder wheel 44 for monitoring the position and rotational velocity of encoder wheel 44 based on the number of spokes 50 that pass over photodetector 56.

Accordingly, the pitch for encoder wheel 44 has an average range (referred to as pitch range 73) between the centers of adjacent spokes 50, which, in the shown embodiment is equal to the combined distance of spoke length 70 and gap length 72. For example, in an embodiment in which encoder wheel 44 has forty-eight spokes 50 and forty-eight gaps 52, the pitch range 73 for each spoke 50 covers an angle of 7.50 degrees. As such, a given spoke 50 may move 3.75 degrees in either rotational direction before moving into an adjacent pitch range 73.

Spoke length 70 and gap length 72 are also desirably proportional to length 68 of photodetector 56 (e.g., approximately equal to length 68). Examples of suitable average dimensions for each of spoke length 70 and gap length 72 range from about 35% of length 68 to about 65% of length 68, with particularly suitable dimensions ranging from about 40% of length 68 to about 60% of length 68, and with even more particularly suitable dimensions ranging from about 45% of length 68 to about 55% of length 68. In one embodiment, spoke length 70 and gap length 72 are each about 50% of length 68 (i.e., pitch range 73 is about equal to length 68). This results in an arrangement in which the 50% intensity point of the shadow falls substantially on the edges of photodetector 56 in the direction of motion.

Since pitch range 73 is dependent on spoke length 70 and gap length 72, pitch range 73 is also desirably proportional to length 68 of photodetector 56, such as being approximately equal to length 68. This allows optical encoder 14 to keep track of spokes 50 as adjacent spokes 50 pass over photodetector 56. Accordingly, examples of suitable dimensions for pitch range 73 range from about 75% of length 68 to about 125% of length 68, with particularly suitable dimensions ranging from about 80% of length 68 to about 120% of length 68, and with even more particularly suitable dimensions ranging from about 90% of length 68 to about 110% of length 68. As mentioned above, in one embodiment, pitch range 73 is about equal to length 68.

The above-discussed dimensions for pitch range 73 are desirable since pitch ranges that are substantially less than length 68 tend to worsen the response time of photodetector 56 and the bright-to-darkness difference may remain the same or decrease. Furthermore, on the other end, pitch ranges that are substantially greater than length 68 may cause the detected signals to devolve from a sinusoid wave to a square wave as the wave shortens.

In the shown embodiment in which optical encoder 14 is a reflection-based encoder, spokes 50 are desirably fabricated from and/or are coated with one or more reflective materials to reflect the light rays emitted from LEDs 54a-54d. Moreover, the one or more reflective materials are also desirably non-specular (e.g., non-mirrored) or substantially non-specular to reduce the scattering of the light rays, thereby reducing undesirable structures due to tilt of encoder wheel 44 or angular variations in the LED intensity. Specular reflection can keep the macroscopic phase information in light rays leaving the material intact (i.e., it functions like a minor). Examples of suitable materials for fabricating encoder wheel 44, including spokes 50, include reflective, non-specular materials, such as stainless steel, where gaps 52 may be etched from encoder wheel 44 using one or more conventional etching techniques.

In comparison, scattering reflection can randomize the phase of the light rays leaving the material, thereby functioning as opalescent glass or smoke. This is beneficial for reducing the unwanted details of the emission patterns of the LEDs, for reducing the exact orientation of the spoke surfaces, and for reducing the depositions of contaminants on the surfaces of spokes 50. Accordingly, in one embodiment, the one or more reflective materials for spokes 50 exhibit scattering reflection.

In an alternative embodiment, encoder wheel 44 may include dark regions in lieu of gaps 52, where the dark regions may be fabricated from and/or are coated with one or more non-reflective, non-specular materials to reduce the reflection of the light rays. In embodiments in which optical encoder 14 is a transmission-based encoder, where the light rays transmit through gaps 52 toward photodetector 56 on the opposing side from LEDs 54a-54d, spokes 50 may be fabricated from and/or are coated with one or more non-specular materials to reduce the scattering of the light rays.

LEDs 54a-54d may be offset from each other substantially in the direction of motion of encoder wheel 44. In some embodiments, LEDs 54a-54d are offset from each other by substantially the same distances in the direction of motion of encoder wheel 44. (referred to as offset lengths 74), where offset lengths 74 are measured from the centers of each LED as shown in FIG. 4. In an alternative embodiment, offset lengths 74 between LEDs 54a-54d may vary. For example, offset lengths 74 between LEDs 54a and 54b, and between LEDs 54c and 54d (i.e., the outer offset lengths 74), may be greater than the offset length 74 between LEDs 54b and 54c.

In one embodiment, offset lengths 74 are proportional to length 68 of photodetector and also to the number of LEDs (or other light sources) used in light set 54. In the shown embodiment, light set 54 includes four LEDs (i.e., LEDs 54a-54d). In this embodiment, examples of suitable average dimensions for each offset length 74 ranges from about 15% of length 68 to about 35% of length 68, with particularly suitable dimensions ranging from about 20% of length 68 to about 30% of length 68. In one embodiment, each offset length 74 is about 25% of length 68.

In alternative embodiments in which light set 54 includes additional numbers of LEDs (or other light sources), offset length 74 may be approximately determined by dividing length 68 by the number of LEDs in light set 54. For example, in embodiment in which light set 54 includes six LEDs, suitable dimensions for offset length 74 include lengths ranging from about 15% of length 68 to about 20% of length 68 (e.g., about 17% of length 68). This six-LED arrangement provides phase shifts of about 60 degrees for adjacent LEDs. Similarly, in embodiment in which light set 54 includes eight LEDs, suitable dimensions for offset length 74 include lengths ranging from about 10% of length 68 to about 15% of length 68 (e.g., about 12% of length 68). This eight-LED arrangement provides phase shifts of about 45 degrees for adjacent LEDs, and phase shifts in quadrature for every other LED.

As discussed below, optical encoder 14 may also include additional light sources (e.g., LEDs) to illuminate alternative portions of encoder wheel 44, such as in embodiments in which encoder wheel 44 has a different pattern. For example, an additional light source may be used as an index or alignment marker to label spoke "0".

Suitable distances between encoder wheel 44 and photodetector 56 (referred to as distance 76) desirably allow the light rays emitted from light set 54 to reach photodetector 56 with illumination intensities that are within detectable ranges of photodetector 56. In the embodiment shown in FIG. 4, in which optical encoder 14 is a reflection-based encoder, the suitable distances allow the light rays emitted from light set 54 to reflect from spokes 50 toward photodetector 56 with detectable illumination intensities. In alternative embodiments in which encoder 14 is a transmission-based encoder, the suitable distances allow the light rays emitted from light set 54 to pass through gaps 52 to photodetector 56 (located on the opposing side of encoder wheel 44 from light set 54) also with detectable illumination intensities. Examples of suitable dimensions for distance 76 range from about 2.5 millimeters (about 100 mils) to about 12.7 millimeters (about 500 mils), with particularly suitable dimensions ranging from about 3.8 millimeters (about 150 mils) to about 7.6 millimeters (about 300 mils).

Accordingly, spoke length 70, gap length 72, pitch range 73, and offset lengths 74 are each desirably proportional to length 68 of photodetector 56. As shown in FIG. 4, this arrangement allows at least one spoke 50 to extend at least partially over photodetector 56 and at least one of LEDs 54a-54d at any time. This allows photodetector 56 to receive light reflected from adjacent spokes 50 to monitor the transitions between spokes 50 as encoder wheel 44 rotates.

In some embodiments, small overall dimensions may require the encoded scale (e.g., encoder wheel 44 or a linear encoded scale) to be positioned close to the photodetector. For example, as discussed below, in embodiments in which the optical encoder of the present disclosure is used to detect and monitor the toggling position of a deposition head of a deposition-based direct digital manufacturing system, the positioning of the encoded scale (e.g., a linear encoded scale) such that the average angle of incidence of light getting to the photodetector from the wheel may be more than about 30 degrees.

In these embodiments, a single reflective knife edge may be used for the encoded scale, rather than a scattering set of spokes or ladder rungs, thereby providing a single reflective spoke and at least one non-reflective region. This is beneficial because the end-to-end motion of the toggle may be small (e.g., about 2 millimeters), which is so small that the brightest and dark signals for each spoke would not be visited for most of the LEDs, thereby potentially hindering calibration routines. Examples of suitable deposition head toggling techniques for use in these embodiments include those disclosed in Leavitt et al., U.S. Pat. No. 7,625,200.

Figure 5A:
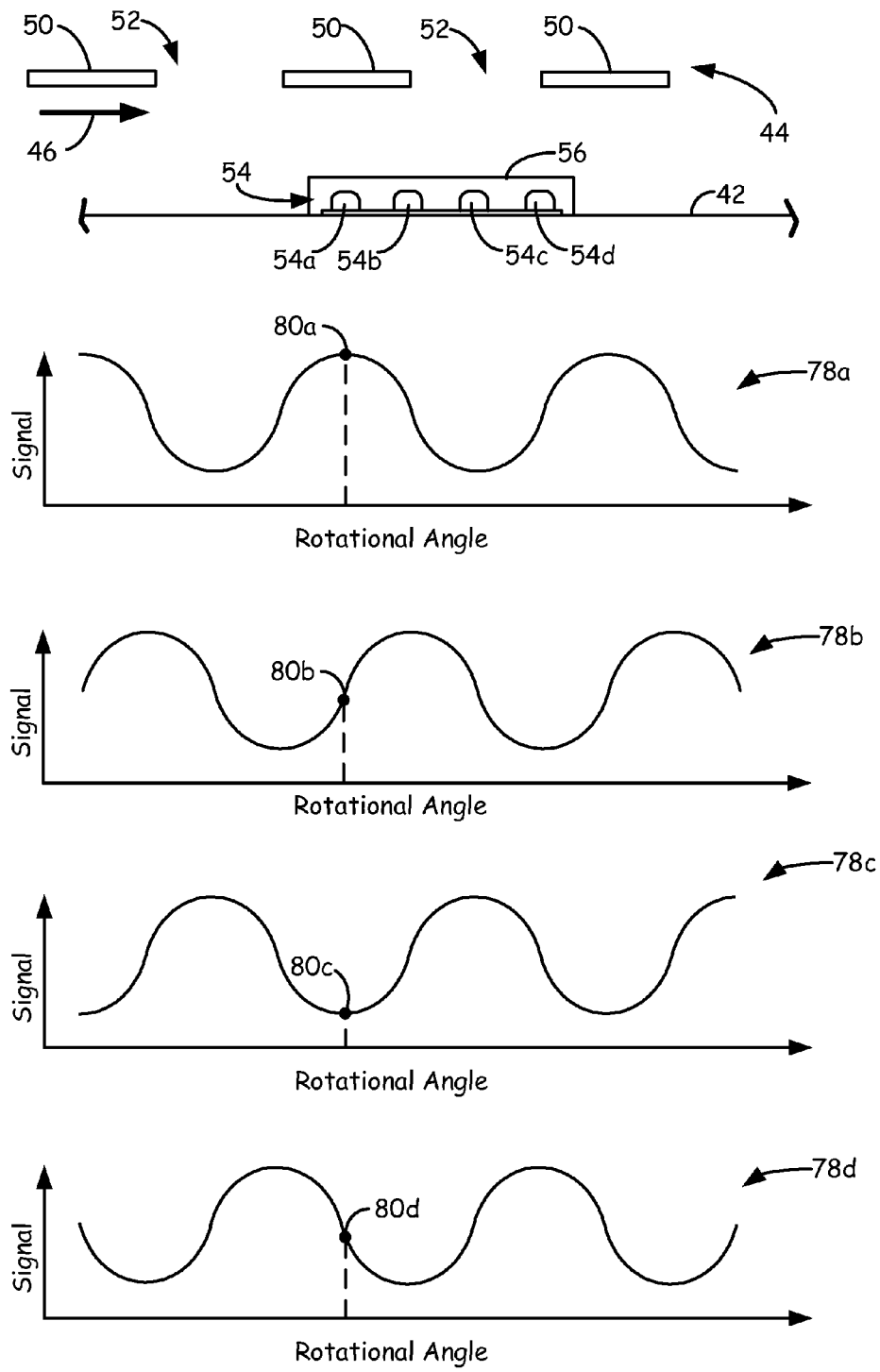
FIGS. 5A-5D are side views of the rotary optical encoder with associated signal waves generated by operation of the rotary optical encoder.

FIG. 5A-5D illustrate waves 78a-78d that are respectively attained from LEDs 54a-54d while encoder wheel 44 rotates at a steady velocity in the direction of arrow 46. FIG. 5A illustrates an example in which one of the spokes 50 of encoder wheel 44 is currently centered over LED 54a. This positions the leading edge of the given spoke 50 over LED 54b, centers an adjacent gap 52 over LED 54c, and positions a trailing edge of an adjacent spoke 50 over LED 54d.

During operation, LEDs 54a-54d are desirably lit up in a serial manner (e.g., in a sequential order and/or an alternating order), where each LED may be lit up while the other LEDs remain unlit. For example, LED 54a may be lit up for a given duration while LEDs 54b-54d remain unlit. While LED 54a shines, a portion of the light rays emitted from LED 54a reflect from spokes 50 toward photodetector 56. Photodetector 56 receives the reflected light rays, which are then amplified and sampled with pre-amplifier 58 and A/D channel 60. The resulting data sample has a signal level based on the illumination intensity of the light rays received by photodetector 56, as illustrated by sample point 80a in wave 78a. The data sample may then be transmitted to processor 62 and memory 64 for processing.

Suitable periods for each LED of LEDs 54a-54d (or any alternative light sources) to shine may vary on multiple factors, such as based on offset lengths 74 and/or a predicted average rotational velocity of encoder wheel 44. These periods may be based on the frequency at which LEDs 54a-54d are lit up and turned off in the serial manner, where a given LED is desirably lit up as soon as a previous LED is turned off. Examples of suitable frequencies for each LED of LEDs 54a-54d to be lit up range from about 10 kilohertz to about 400 kilohertz, where in some embodiments, suitable illumination frequencies ranging from about 15 kilohertz to about 300 kilohertz, and in some additional embodiments, suitable illumination frequencies ranging from about 20 kilohertz to about 100 kilohertz. For example, LEDs 54a-54d may be lit up in a serial manner at a frequency of about 30 kilohertz, which provides about a 33-microsecond period for each LED to shine. At least one of LEDs 54a-54d is desirably lit up at any given time to smooth out current draw from the power supply and to reduce noise.

Furthermore, the sampling rate by A/D channel 60 is desirably greater than the period in which each LED shines, thereby allowing multiple samples to be collected while each LED shines. For example, in embodiments in which each LED shines for a period of about 33 microseconds, a sampling frequency of about 300 kilohertz allows about 10 samples to be collected from each LED while shining. In some embodiments, one or more of the collected samples may be discarded, such as to allow the analog front end to settle to its steady state value.

When the period in which LED 54a shines expires, LED 54a may be turned off and LED 54b may be lit up for the same period while LEDs 54a, 54c, and 54d are unlit. While LED 54b shines, a portion of the light rays emitted from LED 54b reflect from spokes 50 toward photodetector 56. Photodetector 56 receives the reflected light rays, which are then amplified and sampled with pre-amplifier 58 and A/D channel 60. The resulting data sample also has a signal level based on the illumination intensity of the light rays received by photodetector 56, as illustrated by sample point 80b in wave 78b. The data sample may also then be transmitted to processor 62 and memory 64 for processing.

Similarly, when the period in which LED 54b shines expires, LED 54b may be turned off and LED 54c may be lit up for the same period while LEDs 54a, 54b, and 54d are unlit. While LED 54c shines, a portion of the light rays emitted from LED 54c reflect from spokes 50 toward photodetector 56. Photodetector 56 receives the reflected light rays, which are then amplified and sampled with pre-amplifier 58 and A/D channel 60. The resulting data sample also has a signal level based on the illumination intensity of the light rays received by photodetector 56, as illustrated by sample point 80c in wave 78c. The data sample may then be transmitted to processor 62 and memory 64 for processing.

Finally, when the period in which LED 54c shines expires, LED 54c may be turned off and LED 54d may be lit up for the same period while LEDs 54a-54c are unlit. While LED 54d shines, a portion of the light rays emitted from LED 54d reflect from spokes 50 toward photodetector 56. Photodetector 56 receives the reflected light rays, which are then amplified and sampled with pre-amplifier 58 and A/D channel 60. The resulting data sample also has a signal level based on the illumination intensity of the light rays received by photodetector 56, as illustrated by sample point 80d in wave 78d. The data sample may then be transmitted to processor 62 and memory 64 for processing.

A comparison of sample points 80a-80d illustrate how the relative locations of spokes 50 to each of LEDs 54a-54d affects the amount of light rays that are reflected toward photodetector 56. In particular, because the given spoke 50 is centered over LED 54a, sample point 80a has the highest signal level. Correspondingly, because the adjacent gap 52 is centered over LED 54c, sample point 80c has the lowest signal level. LEDs 54b and 54d are located below the edges of spokes 50, thereby providing signal levels at sample points 80b and 80d that are between those of sample points 80a and 80c.

Figure 5B:
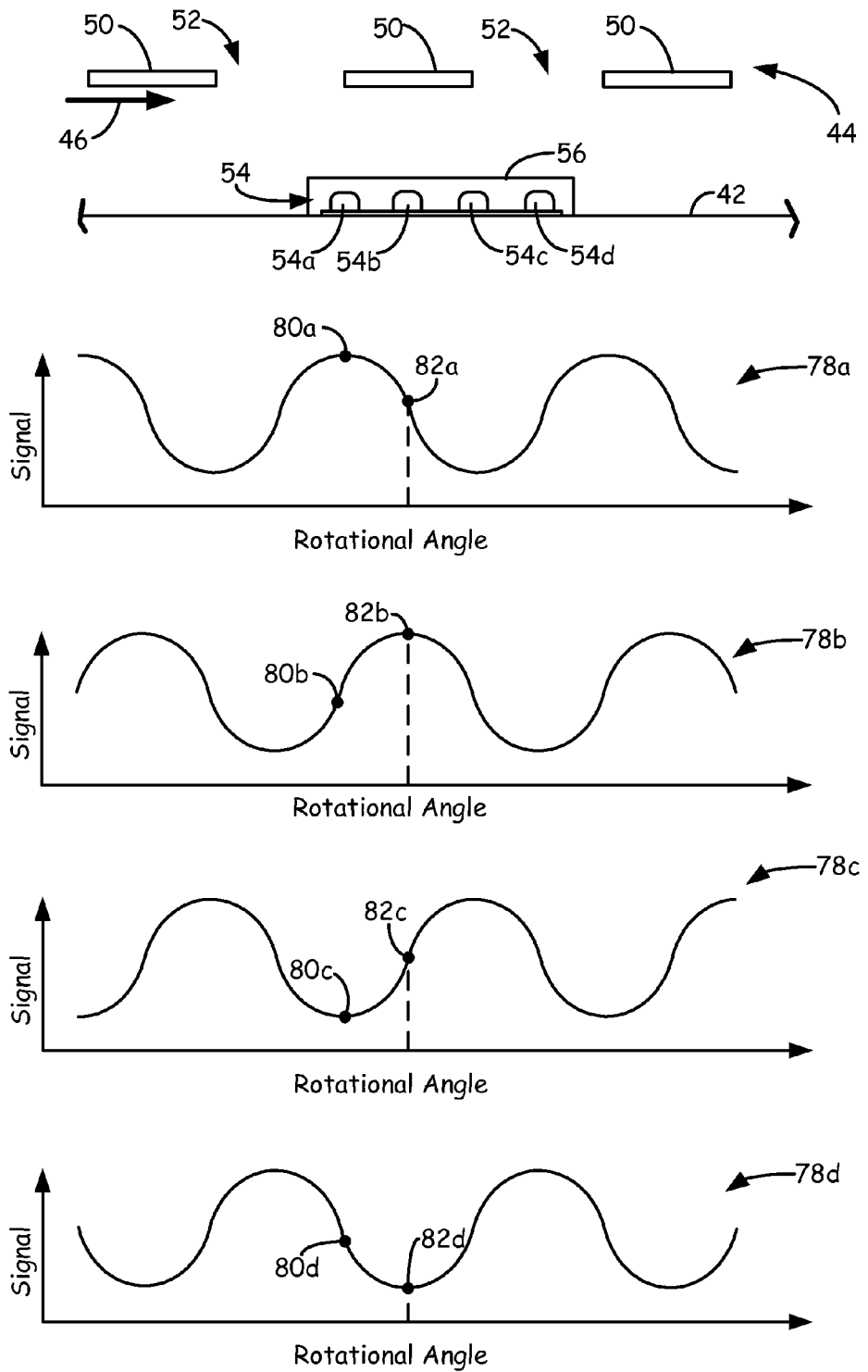
Figure 5C:
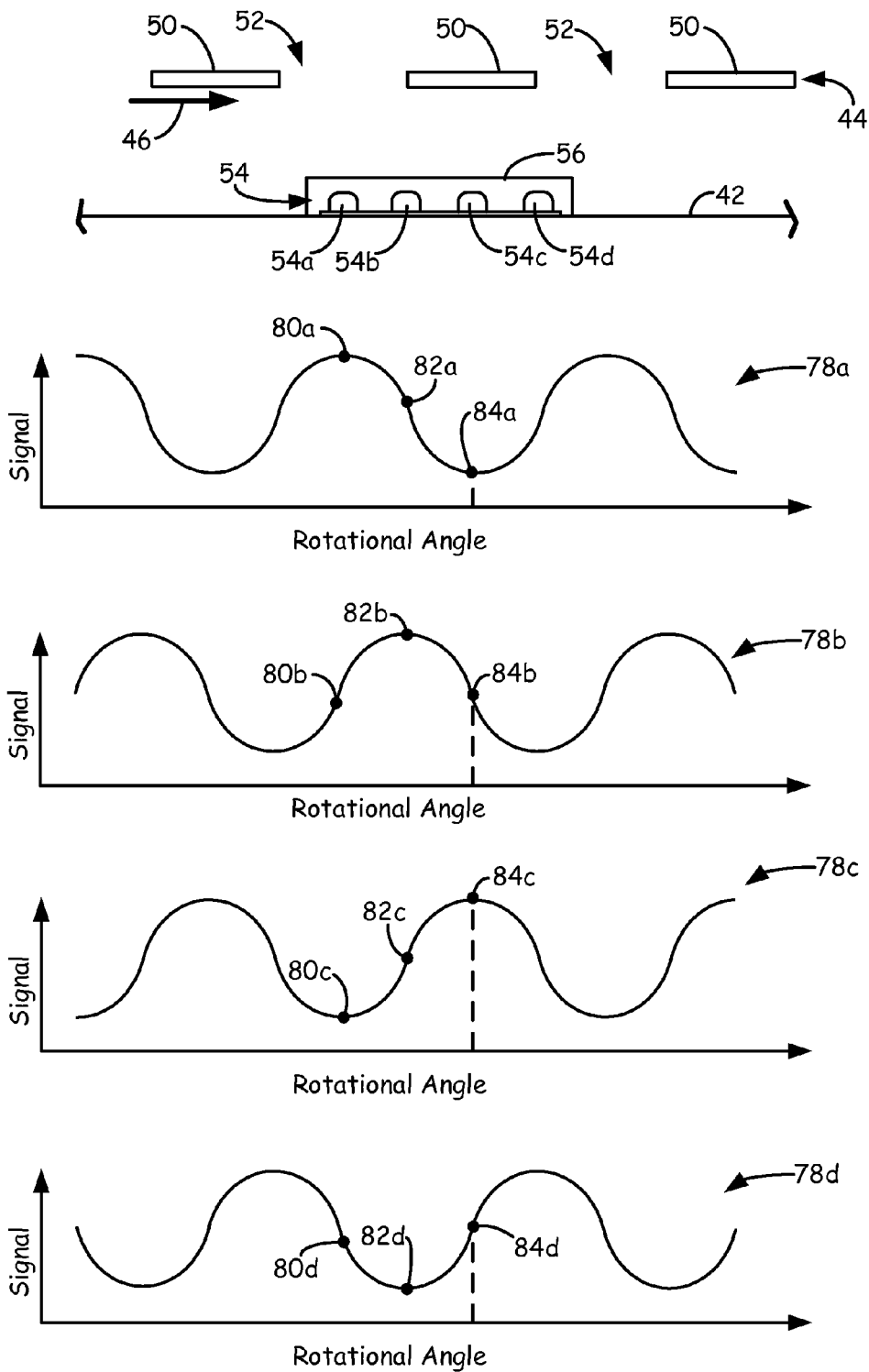
Figure 5D:
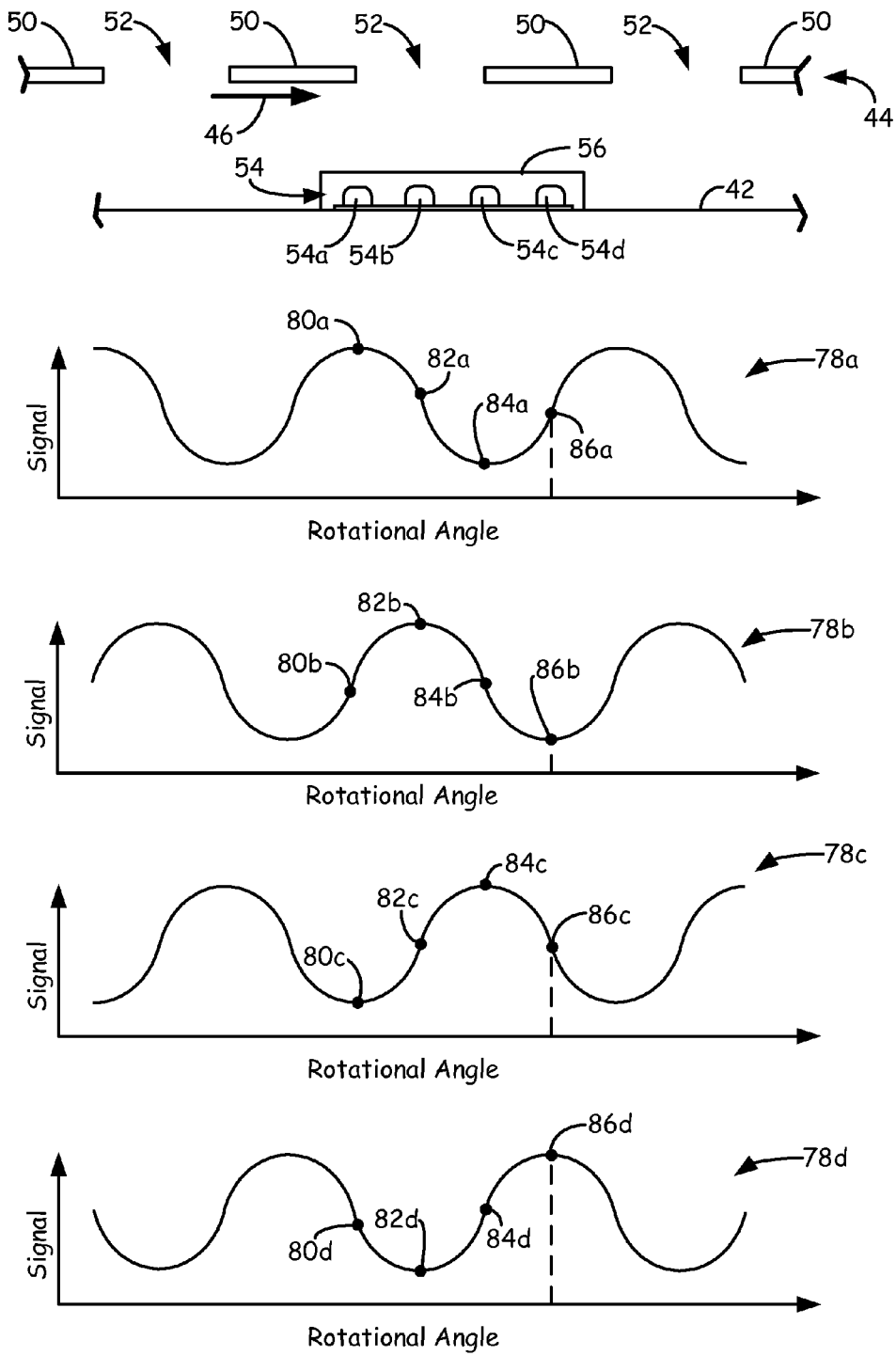

FIGS. 5B-5D illustrate an example in which encoder wheel 44 rotates at a steady velocity in the direction of arrow 46 until the given spoke 50 is centered over LEDs 54b-54d, respectively. As encoder wheel 44 rotates, LEDs 54a-54d may continue to light up in the serial manner, as discussed above, to provide sample points, such as 82a-82d in FIG. 5B, sample points 84a-84d in FIG. 5C, and sample points 86a-86d in FIG. 5D, thereby respectively defining waves 78a-78d.

Waves 78a-78d are phase shifted in quadrature. As discussed above, this may be accomplished by the dimensions of spoke length 70, gap length 72, pitch range 73, and offset length 74 relative to length 68 of photodetector 56. As such, when a spoke 50 is centered over a given $LED_i$, the $LED_i$ provides the highest signal level, the $LED_{i+2}$ provides the lowest signal level that is about 180 degrees offset from that of the $LED_i$ and the $LED_{i+1}$ and the $LED_{i+3}$ provide substantially equal signal levels about 90 degrees offset from that of the $LED_i$. Based on these signal wave patterns, optical encoder 14 may determine the position and rotational velocity of encoder wheel 44. This correspondingly allows optical encoder 14 to determine the position and rotational velocity of axle 40 of drive motor 24 for monitoring the movement of tool 12 (shown in FIG. 1).

Figure 6:
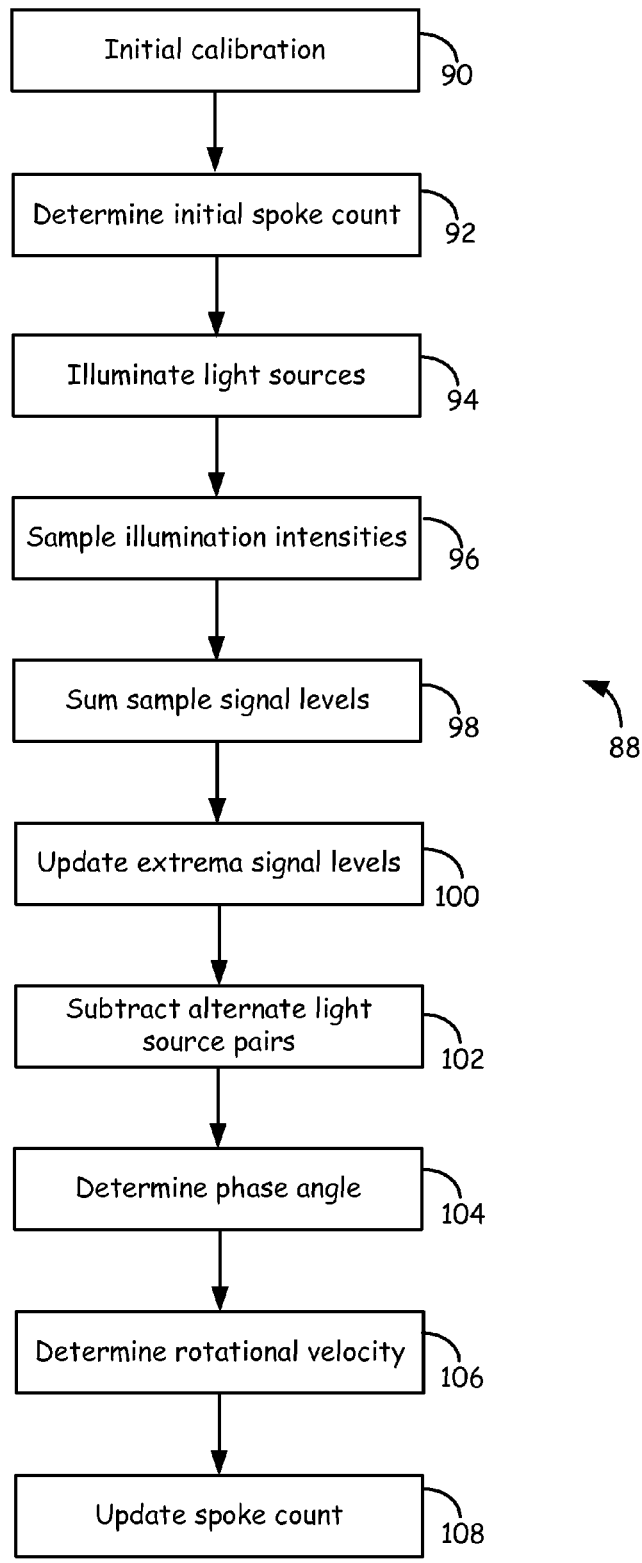
FIG. 6 is a flow diagram of a method for operating the rotary optical encoder.

FIG. 6 is a flow diagram of method 88 for operating optical encoders of the present disclosure, such as optical encoders 14 and 16. For ease of discussion, the following disclosure of method 88 is made with reference to optical encoder 14. As shown in FIG. 6, method 88 includes steps 90-108, and initially involves calibrating circuit board 42 during an initial start up of optical encoder 14 (step 90).

The signal levels for each spoke 50 and for each of LEDs 54a-54d may vary depending on the illumination strength of each LED, the reflective qualities of each spoke 50, and the like. For example, LEDs 54a-54d may have different illumination strengths, such as due to aging. Furthermore, one or more of spokes 50 may collect dust or other contaminants, which may reduce the reflective qualities of the given spokes 50 compared to others. As such, each spoke 50/LED pair is desirably initially calibrated to identify the extrema signal levels (i.e., the maximum and minimum signal levels) that are attainable.

In one embodiment, the extrema signal levels may be initially determined by rotating encoder wheel 44 at a steady velocity and measuring the minimum and maximum signal levels that are obtained with each spoke 50/LED pair. Based on the initial calibration, processor 62 may determine normalization parameters $Sav_{LED_i}$ and $So_{LED_i}$ for each spoke 50/LED pair, pursuant to Equations 1 and 2:

$$Sav_{LED_i} = \frac{Smax_{LED_i} + Smin_{LED_i}}{2} \qquad \text{Equation 1}$$

$$So_{LED_i} = \frac{|Smax_{LED_i} + Smin_{LED_i}|}{2} \qquad \text{Equation 2}$$

where $LED_i$ is one of LEDs 54a-54d, $Smax_{LED_i}$ is the maximum signal level detected from a particular spoke 50 with $LED_i$, $Smin_{LED_i}$ is the minimum signal level detected from a particular spoke 50 with $LED_i$. Processor 62 may store the calibration data and the normalization parameters $Sav_{LED_i}$ and $So_{LED_i}$ in memory 64 and/or in one or more additional computer storage media.

After each spoke 50/LED pair is calibrated, encoder wheel may be rotated to an index orientation to provide an initial spoke count for optical encoder 14, as discussed below (step 92). Because optical encoder 14 is an incremental encoder that measures the position and motion of axle 40 by the change in rotational positions of encoder wheel 44, the index orientation provides a starting point for measuring the change in rotational positions. Processor 62 may identify the index orientation by a particular spoke count over photodetector 56 (e.g., a spoke count of zero), where the subsequent rotation of encoder wheel 44 may increase or decrease the spoke count.

After each spoke 50/LED pair is calibrated and the initial spoke count is determined, LEDs 54a-54d may be lit up in a serial manner (step 94), and one or more samples of the respective illumination intensities may be collected during each illumination period, as discussed above (step 96). The change in position of encoder wheel 44 may be determined after each set of samples from LEDs 54a-54d are collected. Following the example discussed above, an illumination frequency of about 30 kilohertz and a sampling frequency of about 300 kilohertz allows 10 samples to be collected during the 33-microsecond period of each LED. If the first two samples during each period are discarded (e.g., to allow the analog front end to settle to its steady state value), this provides eight sample signals for each LED. These sample signal levels for each LED may then be summed to distinguish the signal levels above the system noise (step 98).

In addition, the extrema signals levels identified during the initial calibration in step 90 may also be updated as optical encoder 14 operates (step 100). This allows the extrema signal levels for a given spoke 50/LED pair to be updated to account for changes in the system noise and signal drift. As discussed above, when a spoke 50 is centered over a given $LED_i$, the $LED_i$ provides the highest signal level, the $LED_{i+2}$ provides the lowest signal level that is about 180 degrees offset from that of the $LED_i$, and the $LED_{i+1}$ and the $LED_{i+3}$ provide substantially equal signal levels about 90 degrees offset from that of the LED$_i$. This relationship may also be used to identify when minimum and maximum signal levels should exist.

For example, when the signal level obtained from LED 54b is substantially equal to the signal level obtained from LED 54d, then one of LEDS 54a and 54c is at its maximum signal level and the other is at its minimum signal level. Thus, processor 62 may determine whether the maximum and/or minimum signal levels of LEDs 54a and 54c need updating when the signal levels of LEDs 54b and 54d are substantially equal. Correlating the calibration updates to this signal relationship reduces the risk of inducing noise and signal drift into the updates. When the extrema signal levels are updated for a given spoke 50/LED pair, the normalization parameters $Sav_{LED_i}$ and $So_{LED_i}$ for the spoke 50/LED pair may also be updated, pursuant to Equations 1 and 2.

In some embodiments, the dark levels of spokes 50 tend to be independent of LEDs 54a-54d, and do not vary much around the circumference of encoder wheel 44, or vary only slowly. As such, in these embodiments, processor 62 may reduce or eliminate the updating and correction of the signal levels corresponding the dark levels (e.g., the minimum signal levels of LEDs 54a-54d).

Since the illumination intensity from each of LEDs 54a-54d are sampled with the same photodetector 56, pre-amplifier 58, and A/D channel 60, and because the illumination periods are relatively short, system noise such as stray or ambient light levels and slowly varying power supply fluctuations may substantially cancel out between each alternate LED pair (i.e., every other LED). As such, the summed signal levels for each alternate LED pair may be subtracted to effectively eliminate system noise (step 102).

This subtraction step may also be combined with the normalization parameters $Sav_{LED_i}$ and $So_{LED_i}$ to determine the values of the noise-free signals, Signal 1 and Signal 2, pursuant to Equations 3 and 4:

$$\text{Signal 1} = \frac{(S_{LED_i} - Sav_{LED_i}) - (S_{LED_{i+2}} - Sav_{LED_{i+2}})}{So_{LED_i} + So_{LED_{i+2}}} \quad \text{Equation 3}$$

$$\text{Signal 2} = \frac{(S_{LED_{i+1}} - Sav_{LED_{i+1}}) - (S_{LED_{i+3}} - Sav_{LED_{i+3}})}{So_{LED_{i+1}} + So_{LED_{i+3}}} \quad \text{Equation 4}$$

where $S_{LED_i}$, $S_{LED_{i+1}}$, $S_{LED_{i+2}}$, and $S_{LED_{i+3}}$ are the summed signal levels from step 98 for LEDs 54a-54d, respectively. Since LEDs 54a-54d are positioned to provide quadrature signals, Signal 1 and Signal 2 desirably meet the criteria of Equation 5:

$$(\text{Signal 1})^2 + (\text{Signal 2})^2 \cong K \quad \text{Equation 5}$$

where K is a constant value. Processor 62 may also store the values of Signal 1 and Signal 2 in memory 64 and/or in one or more additional computer storage media.

Processor 62 may then determine the phase angle of the current spoke 50 based on Signal 1 and Signal 2 (step 104). The phase angle is the range of movement of the given spoke 50 from a central point within a pitch range 73, and may be determined using a variety of different computational techniques with Signal 1 and Signal 2. For example, processor 62 may perform one or more arctangent-equivalent functions, such as a trigonometric function, a parabolic fit function, a piece-wise linear fit function, and combinations thereof. In one embodiment, the arctangent-equivalent function involves a two-argument arctangent function (i.e., an a tan 2 function) pursuant to Equation 6:

$$\theta = a\tan 2(\text{Signal 1}, \text{Signal 2}) \quad \text{Equation 6}$$

The two-argument arctangent function of Equation 6 can be scaled to any $2\lambda$ interval, such as a "$-\lambda$ to $\lambda$" interval or a "0 to $2\lambda$" interval. Following the above-discussed example in which the pitch range 73 for each spoke 50 covers an angle of 7.50 degrees, under a "0 to $2\lambda$" interval, a phase angle $\theta=0$ refers to a spoke movement of 3.75 degrees in a first rotational direction (e.g., along arrow 46), and a phase angle $\theta=2\lambda$ refers to a spoke movement of 3.75 degrees in a second opposing rotational direction (e.g., along arrow 48).

The above-discussed determination of the phase angle is based on a criteria that encoder wheel 44 rotates at a velocity that is substantially less than the sampling frequencies of LEDs 54a-54d. However, if encoder wheel 44 rotates rapidly, one or more spokes 50 may pass over photodetector 56 between adjacent LED periods, which may prevent them from being detected. For illumination frequencies of about 30 kilohertz and sampling frequencies of about 300 kilohertz, the above-determined phase angle provides suitable measurements for rotational velocities up to about five revolutions-per-second.

Since many industrial and commercial systems require encoder wheel 44 to rotate faster than about five revolutions-per-second, processor 62 may also determine the rotational velocity of encoder wheel 44 to identify if one or more spokes 50 pass over photodetector 56 between adjacent LED periods (step 106). In one embodiment, processor 62 may determine the rotational velocity of encoder wheel 44 based on the multiple samples collected during each illumination period. As discussed above for step 98, multiple samples of the signal levels are desirably taken and summed to provide $S_{LED_i}$, $S_{LED_{i+1}}$, $S_{LED_{i+2}}$, and $S_{LED_{i+3}}$.

In addition to summing the signal levels of the samples, processor 62 may also determine the difference of the first half of the collected samples minus the second half of the collected samples pursuant to Equation 7:

$$\Delta R = \sum_{j=1}^{m/2} \text{Sample}(j) - \sum_{k=\frac{m}{2}+1}^{m} \text{Sample}(k) \quad \text{Equation 7}$$

For example, if eight non-discarded samples are taken during an illumination period of LED 54a, $\Delta R$ would be the sum of the signal levels of samples 1-4 minus the sum of the signal levels of samples 5-8. Summing the sample groups in this manner is desirable for exceeding system noise levels as the rotational velocity of encoder wheel 44 increases.

Accordingly, when encoder wheel 44 rotates slowly, $\Delta R \cong 0$. However, when encoder wheel 44 rotates at a high velocity, the $\Delta R$ increases or decreases based on the direction of rotation. Processor 62 may calculate the rotational velocity of encoder wheel 44 based on the magnitude and the positive/negative value of $\Delta R$, and on the sampling frequency used. This determination may also be performed based on the samples from each illumination period of LEDs 54a-54d to continuously monitor the rotational velocity of encoder wheel 44.

If the rotational velocity of encoder wheel 44 exceeds an illumination period, processor 62 may use the rotational velocity to determine how many spokes 50 passed across photodetector 56 between illumination periods. Processor 62 may then update the spoke count of encoder wheel 44 with the use of the current phase angle, a previous phase angle, and the number of spokes 50 that may have been missed due to a high rotational velocity (step 108).

For example, processor 62 may initially determine the difference between the current phase angle and the previous phase angle. If the difference between them is greater than about λ, then the spoke count may be decreased by one spoke 50. Alternatively, if the difference between them is less than about −π, then the spoke count may be increased by one spoke 50.

Additionally, the spoke count may be increased or decreased based on the number of spokes 50 missed due to a high rotational velocity. Deriving the position of encoder wheel 44 from the phase angle and the measured velocity allows optical encoder 14 to track velocities up to the point that is limited by the response time of the analog front end, which may be equivalent to rotational velocities up to about 500 revolutions-per-second. This detection rate is equivalent to about 100,000 counts-per-revolution or about 50,000,000 counts-per-second, which is about two orders of magnitude faster than currently-available low cost devices.

Method 88 illustrates an example of a suitable technique for operating optical encoders of the present disclosure. Alternatively, the optical encoders may be operated with a variety of different techniques. For example, in one embodiment, steps 100-108 may be replaced with, or used in addition to, a voting approach. In the voting approach, processor 62 may retrieve one or more models from memory 64. The model(s) are reflection parameters for encoder wheel 44, which provides estimates of the reflected signals for specified rotational orientations of encoder wheel 44. The model(s) may be preset values and/or attained through calibration routines, as discussed above.

Processor 62 may then estimate a goodness of fit by comparing the summed samples (from step 98 of method 88) to the previously-determined estimates of the reflected signals, thereby providing root-mean-square (RMS) error values. This process may assume that stray light being detected by photodetector 56 is substantially constant over the sampling period of step 96 of method 88. Accordingly, processor 62 may perform a course-fine search routine starting with an estimated rotational orientation of encoder wheel 44, where the estimated rotational orientation may be based on the previous rotational orientation and rotational velocity of encoder wheel 44.

Processor 62 may then perform a least squares fit to the summed signals relative to the estimates of the reflected signals. This effectively determines and subtracts out the stray light levels in a similar manner to that discussed above step 102 of method 88, and allows the phasing to change for high rotational rates, thereby allowing the correct rotational orientation of encoder wheel 44 to be identified. The voting approach is beneficial to account for variations in signal amplitudes and phases, which may not be in perfect quadrature arrangements.

Optical encoder 14 discussed above is an example of a suitable incremental rotary encoder of the present disclosure. Additionally, the optical encoders of the present disclosure may alternatively include a variety of different designs, such as transmission-based rotary encoder designs, transmission-based linear encoder designs, reflection-based linear encoder designs, and the like. This allows the optical encoders to be used to monitor position and motion of components in a variety of industrial and commercial systems.

Figure 7:
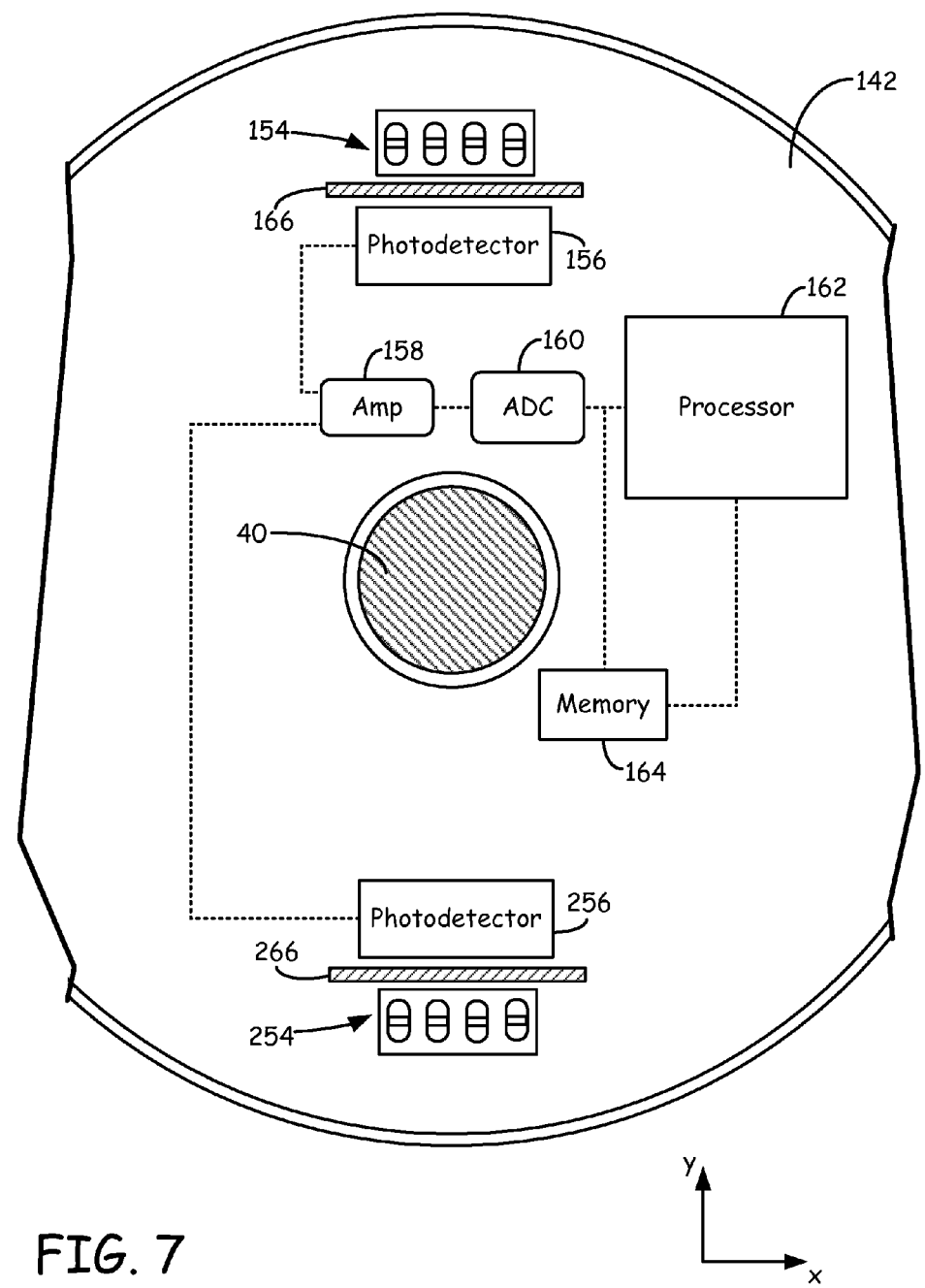
FIG. 7 is a front view of an alternative circuit of the rotary optical encoder, which includes two groups of four light sources and associated photodetectors.

FIG. 7 is a simplified illustration of circuit board 142, which is an alternative to circuit board 42 (shown in FIG. 2) for use in optical encoder 14, and where the corresponding reference labels are increased by "100". As shown in FIG. 7, circuit board 142 also includes light source 256, photodetector 258, and barrier 266, which are diametrically opposed across axle 40 from light source 156, photodetector 158, and barrier 166. This arrangement may be used to reduce or cancel eccentricity between the rotational axis of encoder wheel 44 and axle 40 (e.g., due to a non-coaxial mounting of encoder wheel 44 to axle 40).

Light sources 156 and 256, photodetectors 158 and 258, and barriers 166 and 266 may function in the same manner as discussed above for light source 56, photodetector 58, and barrier 66. In this embodiment, however, pre-amplifier 158 is capable of receiving signal currents from photodetectors 156 and 256. As such, after samples are collected using the four LEDs of light source 154 and photodetector 156, samples may then be collected using the four LEDS of light source 254 and photodetector 256 using the same process, and this alternating pattern may be continuously repeated. Thus, A/D channel 160 may collect samples from photodetectors 156 and 256 in an alternating manner.

Accordingly, steps 92-108 of method 88 (shown in FIG. 6) may be performed for each light source/photodetector pair to provide a first phase angle $\theta_A$ and a first spoke count $N_A$ from light source 154 and photodetector 156, and a second phase angle $\theta_B$ and a first spoke count $N_B$ from light source 254 and photodetector 256. The phase angles $\theta_A$ and $\theta_B$ and spoke counts $N_A$ and $N_B$ each define an orientation for encoder wheel 44 relative to axle 40. These orientations may then be averaged to correct for any eccentricity of encoder wheel 44 relative to axle 40.

In one embodiment, this may involve initially determining the average θave and the difference $\theta_{diff}$ of the first and second phase angles, pursuant to Equations 8 and 9:

$$\theta_R = \frac{\theta_A + \theta_B}{2} \qquad \text{Equation 8}$$

$$\theta_{diff} = \theta_A - \theta_B \qquad \text{Equation 9}$$

where $\theta_{diff}$ oscillates about zero once per revolution of encoder wheel 44.

The amplitude and phase of the eccentricity of encoder wheel 44 relative to axle 40 may then be determined pursuant to Equations 10 and 11:

$$n_{peak} = \frac{N_s}{2\pi} \tan^{-1}\left(\frac{S1}{S2}\right) \qquad \text{Equation 10}$$

$$ecc = \frac{D_{eff}}{N_s} \sqrt{S1^2 + S2^2} \qquad \text{Equation 11}$$

where $N_s$ is the total number of spokes 50 in encoder wheel 44 (e.g., 48), $D_{eff}$ is the effective diameter of encoder wheel 44, $n_{peak}$ is the index of the spoke 50 furthest from the axis of rotation, and ecc is the eccentricity of encoder wheel 44 relative to axle 40. S1 and S2 may be determined pursuant to Equations 12 and 13:

$$S1 = \sum \sin\left(\frac{2\pi n}{N_s}\right) \theta_{diff}(n) \qquad \text{Equation 12}$$

$$S2 = \sum \cos\left(\frac{2\pi n}{N_s}\right) \theta_{diff}(n) \qquad \text{Equation 13}$$

where n is the spoke index, such as a spoke index based on the spoke count $N_A$ for phase angle θA (i.e., n=$N_A$ % $N_s$), where n ranges from 0 to less than $N_s$.

Figure 8:
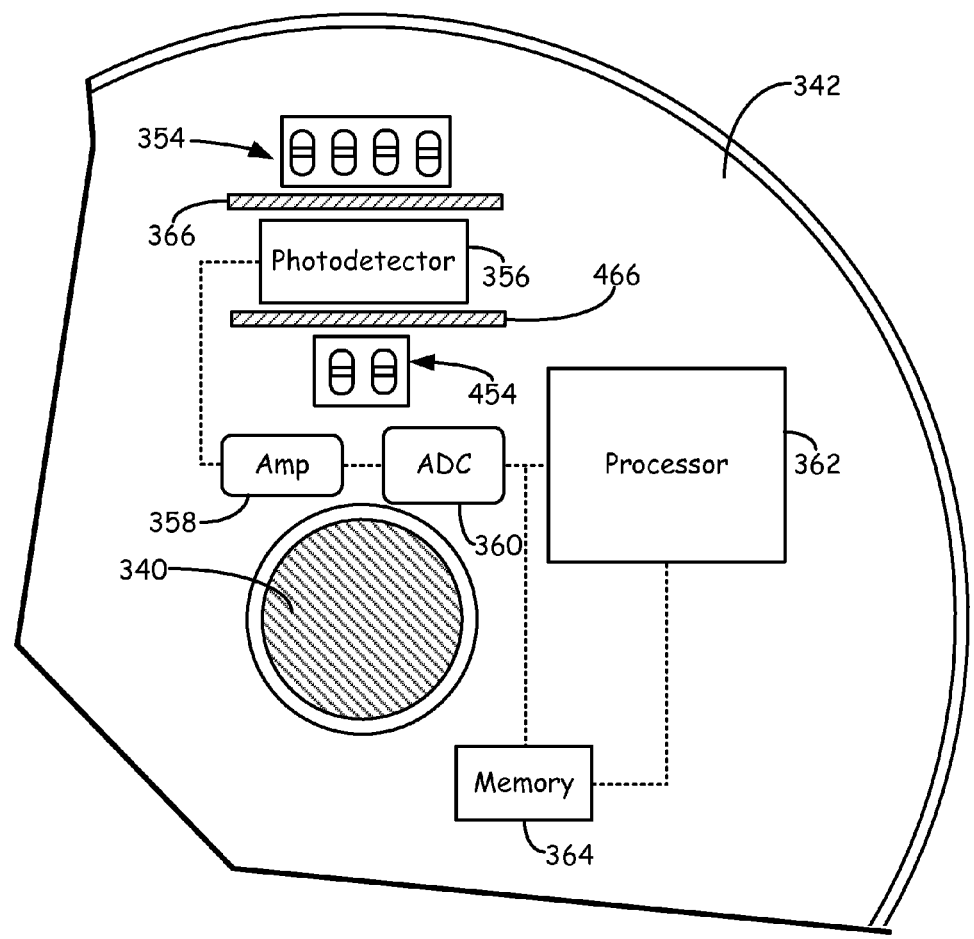
FIG. 8 is a front view of a second alternative circuit of the rotary optical encoder, which includes an additional group of light sources that may provide an indexing function.
Figure 9:
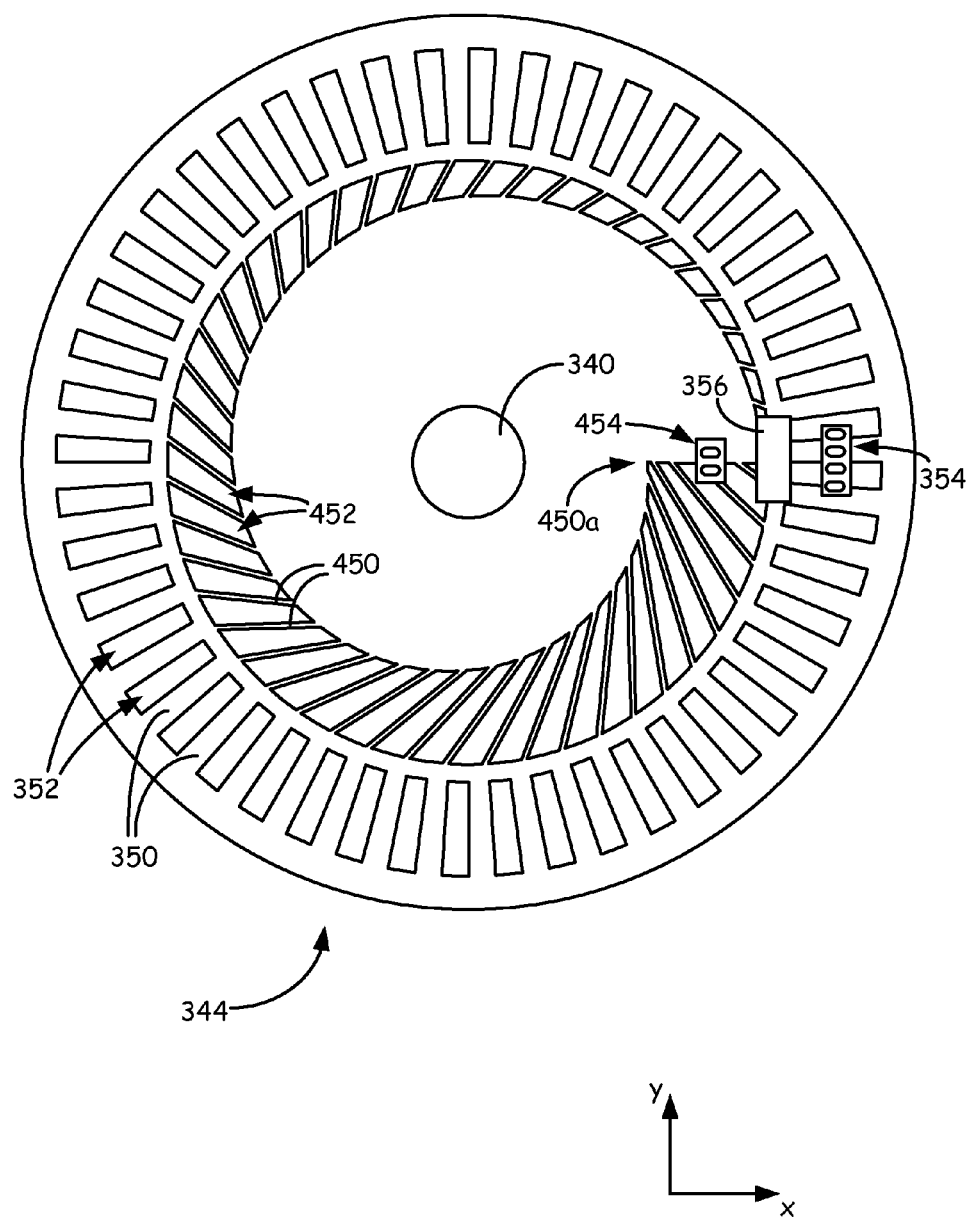
FIG. 9 is a front view of an alternative encoder wheel of the rotary optical encoder, which includes indexing spokes and gaps.

FIGS. 8 and 9 illustrate an additional alternative embodiment that provides an indexing function to identify a starting orientation (e.g., to label spoke "0"). As shown in FIG. 8, circuit board 342 is an alternative to circuit board 42 (shown in FIG. 3) and/or circuit board 142 (shown in FIG. 7) for use in optical encoder 14, and where the corresponding reference labels are increased by "300" from circuit board 42. Circuit board 342 also includes light source 454 and barrier 466, which are on the opposing side of photodetector 356 from light source 354 and barrier 366. In the shown embodiment, light source 454 includes a pair of LEDs, which may function in the same manner as discussed above for LEDs 54a-54d (shown in FIG. 3), and may illuminate in series with the LEDs of light source 354. In alternative embodiments, light source 454 may include additional numbers of LEDs.

As shown in FIG. 9, encoder wheel 344 is an alternative to encoder wheel 44 (shown in FIG. 2), where the corresponding reference labels are increased by "300". Encoder wheel 344 also includes indexing spokes 450 and indexing gaps 452, which operate with light source 454 to provide an indexing function. The peak intensity detected from each of spokes 350 may vary around encoder wheel 344, even as much as +/−30%. This is fine if you know which spoke you are looking at, and problematic if you don't.

Storing calibration models of spokes 350, as discussed above, is suitable during operation of optical encoder 14. However, recalling this information during start up maybe difficult if the absolute rotational orientation of encoder wheel 344 is unknown. For example, processor 362 may operate under the assumption that it is looking at a particular spoke 350 having a peak intensity of +30% from a average peak intensity, while it is actually looking at a spoke 350 having a peak intensity of −30% from the average peak intensity.

Accordingly, during start up, processor 362 may initially assume that each spoke 350 has the same reflectivity (i.e., a vanilla state), thereby reporting a coarse rotational orientation and a coarse moving-average filtered velocity. Processor 362 then looks for the rotational orientation at which one of the LEDs of light source 454 provides a bright signal and the other LED of light source 454 provides a dark signal. This corresponds to the orientation shown in FIG. 9, where edge location 450a of the spiral arrangement of spokes 450 is centered relative to light source 454. At this point, processor 362 identifies the spoke 350 that radially corresponds to edge location 450a, thereby providing the absolute rotational orientation of encoder wheel 344. Once this absolute spoke number is identified, processor 362 may then retrieve the calibration model, as discussed above, to operate encoder wheel 14.

While shown with a spiral arrangement of spokes 350 and gaps 352, encoder wheel 344 may alternatively include a variety of different indexing marks to identify the absolute orientation of encoder wheel 344. For example, encoder wheel may include a single gap 452 at edge location 450a, which may be radially aligned with a spoke count "0" for spokes 350.

Figure 10:
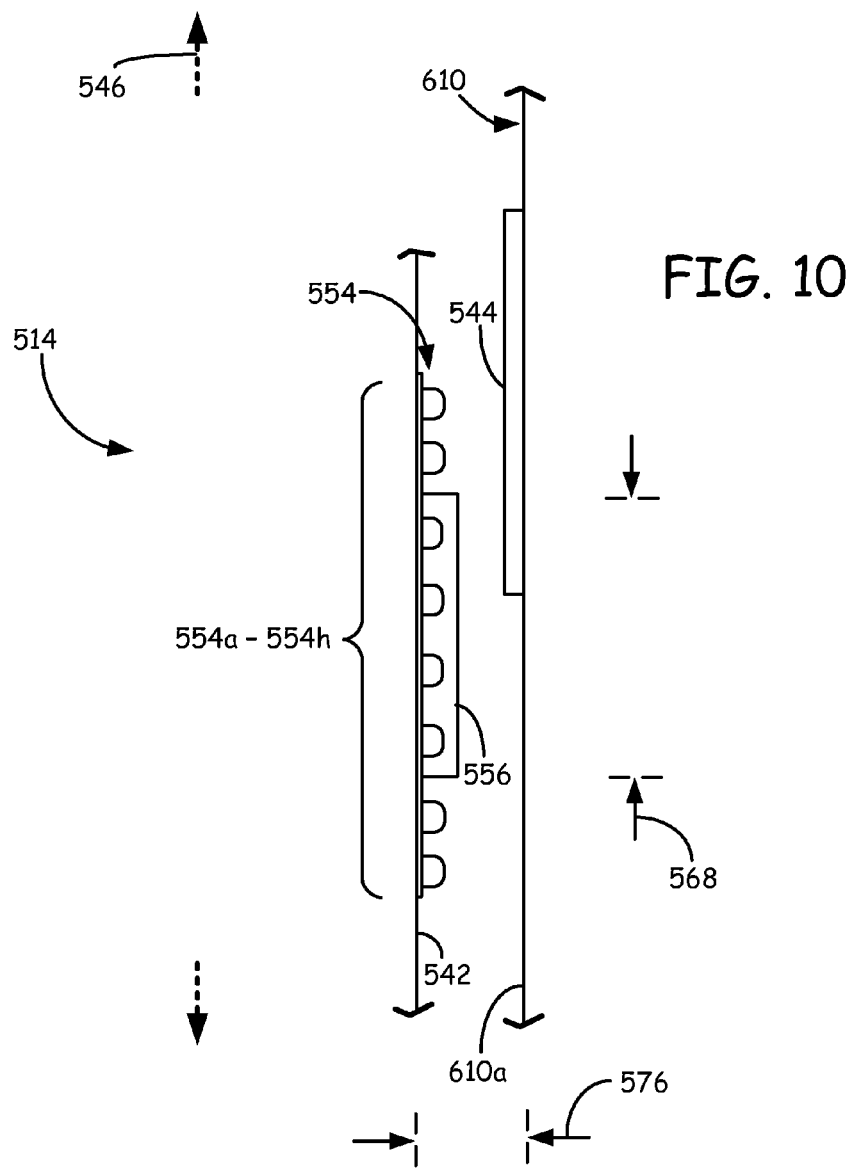
FIG. 10 is a side view of an alternative optical encoder of the present disclosure.

FIG. 10 is a side schematic view of optical encoder 514, which is an example of an alternative optical encoder of the present disclosure to optical encoder 14, and where corresponding reference numbers are increased by "500". As shown in FIG. 10, optical encoder 514 includes reflective surface 544, which is a single reflective knife edge that functions as the encoder scale. As discussed above, a single reflective knife edge may be used for the encoded scale, rather than a scattering set of spokes or ladder rungs, thereby providing a single reflective surface and at least one non-reflective region. Accordingly, reflective surface 544 is desirably a specular reflective surface.

In the shown embodiment, reflective surface 544 is mounted to moveable component 610 and is configured to move along a linear vertical axis 546. In comparison, light set 554 and photodetector 556 are secured to circuit board 542 and do not move relative to each other. In the shown arrangement, optical encoder 514 may be used to detect and monitor the toggling position of a deposition head of a deposition-based direct digital manufacturing system, such as those in disclosed in Leavitt et al., U.S. Pat. No. 7,625,200.

In this embodiment, the deposition head may include a liquefier assembly or receptacle portion that is configured to toggle vertically between a raised position and a lowered position, along axis 546. For example, moveable component 610 may be a wall of a liquefier assembly or receptacle portion of the deposition head. Circuit board 542 may accordingly be mounted to a frame structure of the deposition head, thereby allowing reflective surface 544 and moveable component 610 to toggle vertically relative to light set 554 and photodetector 556.

The toggling of a liquefier assembly or receptacle portion typically exhibits a small range of end-to-end motion between the raised and lowered positions. Such small ranges of motion may be so small that the brightest and dark signals for each spoke of a larger encoder wheel may not necessarily be visited for most of the LEDs, thereby potentially hindering calibration routines. As a result, reflective surface 544 is desirably positioned close to photodetector 556.

As can be readily recognized in FIG. 10, the close positioning of reflective surface 544 relative to photodetector 556 results in higher angles of incidence for the light reflecting from reflective surface 554 to photodetector 556. The positioning of reflective surface 544 relative to photodetector 556 (referred to as distance 576) may vary depending on the dimensions of photodetector 556. Photodetector 556 has a characteristic length in the direction of motion of reflective surface 544 (referred to as length 568). Suitable lengths for length 568 include those discussed above for length 68 of photodetector 56. However, in comparison to distance 76, which may be substantially greater than length 68, distance 576 between reflective surface 544 and photodetector 556 may be relatively small. Suitable distances for distance 576 include those less than about 300% of length 568. Correspondingly, suitable average angles of incidence of light reflecting to photodetector 556 from reflective surface 54d range from about 30 degrees to about 70 degrees.

Moveable component 610 desirably includes non-reflective surface 610a adjacent to reflective surface 544. Non-reflective surface 610a may be a surface coated with or otherwise including one or more dark, non-reflective, and/or light-absorbing materials to prevent or otherwise reduce the reflection of the light rays. This provides a sharp contrast between the reflectiveness of reflective surface 544 and the non-reflectiveness of surface 610a.

Light set 554 includes eight LEDS, referred to as LEDs 54a-5h that may function in the same manner as discussed above for LEDs 54a-54d. In alternative embodiments, light set 554 may include fewer or additional numbers of LEDs, as also discussed above for LED set 54. Optical encoder 514 also desirably includes a barrier (not shown) corresponding to barrier 66 (shown in FIG. 3). In this embodiment, the barrier also desirably has dimensions that prevent light rays emitted from LEDS 554a-554h from travelling directly toward photodetector 556, while also allowing light reflected from reflective surface 544 to reach photodetector 556, despite the higher angles of incidence.

Figure 11:
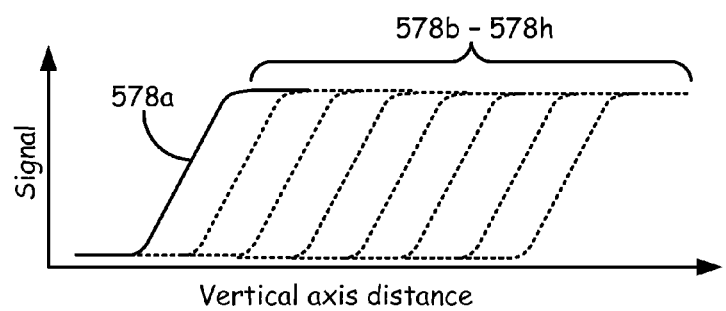
FIG. 11 is a graphical illustration of signal waves generated by operation of the alternative optical encoder.

Optical encoder 514 may operate in the same manner as discussed above for optical encoder 14, where the knife edge arrangement of optical encoder 514 provides precise demarcations of where the light rays emitted from LEDs 554a-554h are reflected. As shown in FIG. 11, wave 578a is a signal wave attained from LED 54a as reflective surface 544 moves downward along axis 546. In comparison to waves 78a-78d (shown in FIGS. 5A-5D), wave 578a does not exhibit a sine-wave profile. This is due to the use of a single reflective surface (i.e., reflective surface 544) rather than a series of light-scattering spokes (e.g., spokes 50). Additionally, wave 578a has a sharper, more linear slope compared to waves 78a-78d due to the knife-edge arrangement of reflective surface 544 and non-reflective surface 610a.

LEDS 54b-54h may also generate waves 578b-578h, which are illustrated with hidden lines and are similar to wave 578a. Waves 578a-578h are offset from each other along vertical axis 546 by about 50% of the distance between the respective LEDs. For example, wave 578b is offset from wave 578a by about 50% of the distance along vertical axis 546 between LED 554a and LED 554b.

Prior to operation, optical encoder 514 may undergo one or more calibration routines in the same manner as discussed above for optical encoder 14, which can identify the extrema signal levels for each of LEDS 554a-554h. Such calibration routines are suitable to account for differences in emission patterns between LEDs 554a-554h, differences in emission intensities between LEDs 554a-554h, differences in offset distances between one or more of LEDs 554a-554h, and the like. Since the calibration routine identifies the extrema signal levels for each of LEDS 554a-554h, the orientation of reflective surface 544 on moveable component 610 is not critical to the operation of optical encoder 514.

Additionally, in embodiments in which optical encoder 514 is configured to detect and monitor the toggling position of a deposition head of a deposition-based direct digital manufacturing system, various independent calibration routines of the deposition head may also be used to further calibrate optical encoder 514. For example, during an initialization cycle, the deposition head may toggle the liquefier assembly or receptacle portion upwards and downwards. Since the system recognizes when the raising and lowering occurs, the system may monitor the signals received by photodetector 556 to further refine the extrema signal levels for each of LED 554a-554h, as well as identifying the signal levels for the range of travel (i.e., the upper and lower positions along vertical axis 546.

Furthermore, deposition-based direct digital manufacturing system typically include platens that move vertically, as disclosed in Leavitt et al., U.S. Pat. No. 7,625,200. The platens are also typically calibrated to ensure proper increment adjustments during a build operation to build a three-dimensional part. The calibration mechanism for calibrating the platen may also function as an independent calibration mechanism for optical encoder 514. For example, the platen may be moved to contact the deposition head and move moveable component 610 upward along vertical axis 546. The system may also monitor these signals received by photodetector 556 to further refine the extrema signal levels for each of LED 554a-554h.

After being calibrated, optical encoder 514 may then be used to monitor the toggling of the deposition head. In particular, optical encoder 514 may identify the extent and direction of movement of moveable component 610 along vertical axis 546 with high levels of precision. This is particularly beneficial for use in monitoring the toggling of a deposition head of a deposition-based direct digital manufacturing system. Such systems typically require high levels of precision along vertical axis 546 when toggling between raised and lowered positions. As such, optical encoder 514 may monitor the toggling of the deposition head over numerous toggle cycles, thereby ensuring the toggles actually occur when directed, and ensuring that the proper toggle ranges are maintained.

Although the present disclosure has been described with reference to several embodiments, workers skilled in the art will recognize that changes may be made in form and detail without departing from the spirit and scope of the disclosure.

The invention claimed is:

1. An optical encoder for use with a deposition head of a direct digital manufacturing system that is configured to toggle between a raised position and a lowered position along a first axis, the optical encoder comprising:
   a set of at least four light sources configured to emit light rays in a serial manner;
   an encoded scale comprising a reflective component and a non-reflective region offset along the first axis, the reflective component being configured to reflect at least a portion of the emitted light rays;
   a photodetector associated with the set of at least four light sources, wherein the photodetector is configured to detect at least a portion of the reflected light rays and to generate signals based on the detected light rays for each of the light sources, wherein the photodetector has a characteristic length along the first axis, and wherein the photodetector is offset from the encoded scale by a distance that is less than about 300% of the characteristic length; and
   a controller configured to determine positions of the encoded scale along the first axis based at least in part of the generated signals, wherein the determined positions of the encoded scale correspond to toggle positions of the deposition head along the first axis.

2. The optical encoder of claim 1, wherein the encoded scale is retained by the deposition head or a moveable receptacle for the deposition head, and wherein the set of at least four light sources, the photodetector, and the controller are mounted to a frame structure for the deposition head such that the encoded scale toggles with the deposition head relative to the set of at least four light sources and the photodetector.

3. The optical encoder of claim 1, wherein the characteristic length of the photodetector ranges from about 2.5 millimeters to about 3.8 millimeters.

4. The optical encoder of claim 1, and further comprising a barrier disposed between the set of at least four light sources and the photodetector, the barrier being configured to prevent the light rays emitted from the set of at least four light sources from traveling directly toward the photodetector.

5. The optical encoder of claim 1, wherein the reflective surface comprises a specular reflective surface.

6. The optical encoder of claim 1, and further comprising an analog/digital channel configured to sample signals operably received from the photodetector, wherein the analog/digital channel is configured to collect multiple samples of the signals during an illumination period of each light source of the at least four light sources.

7. The optical encoder of claim 1, wherein the photodetector is a first photodetector and the at least four light sources constitute a first light set, and wherein the optical encoder further comprises:

a second photodetector having a characteristic length along the first axis that is substantially the same as the characteristic length of the first photodetector; and a second light set comprising at least four light sources configured to emit light rays in a serial manner, wherein the at least four light sources of the second set are offset from each other along the first axis.

8. The optical encoder of claim 1, wherein the set of at least four light sources comprises eight light sources.

9. A method for operating an optical encoder with a deposition head and a frame structure of a direct digital manufacturing system, the method comprising:

toggling the deposition head relative to the frame structure along a first axis between a raised position and a lowered position;

emitting light rays from each light source in a set of at least four light sources in a serial manner, the set of at least four light sources being retained by the frame structure;

reflecting at least a portion of the light rays emitted from each of the light sources from an encoded scale retained by the deposition head or a moveable receptacle for the deposition head;

detecting at least a portion of the reflected light rays with a photodetector associated with the set of at least four light sources, wherein the photodetector has a characteristic length along the first axis, and is retained by the frame structure at an offset distance from the encoded scale that is less than about 300% of the characteristic length;

generating signals based on the detected light rays for each of the light sources; and determining positions of the encoded scale along the first axis based at least in part of the generated signals, wherein the determined positions of the encoded scale correspond to toggle positions of the deposition head along the first axis.

10. The method of claim 9, wherein determining the positions of the encoded scale along the first axis comprises performing a goodness of fit comparison on the signals relative to previously determined estimates of the signals.

11. The method of claim 9, wherein at least a portion of the generated signals are substantially in quadrature, and wherein determining the positions of the encoded scale along the first axis comprises:

subtracting the signals that are substantially in quadrature; and performing one or more arctangent-equivalent functions on the subtracted signals.

12. The method of claim 9, and further comprising preventing the light rays emitted from the set of at least four light sources from traveling directly toward the photodetector with a barrier disposed between the set of at least four light sources and the photodetector.

13. The method of claim 9, and further comprising calibrating the optical encoder base on the toggling of the deposition head.

14. The method of claim 13, wherein reflecting at least the portion of the light rays comprises the reflecting at least the portion of the light rays with an average angle of incidence to the photodetector ranging from about 30 degrees to about 70 degrees.

15. A deposition head assembly for use in a direct digital manufacturing system, the deposition head assembly comprising:

a frame structure;

a deposition head and, optionally, a moveable receptacle for the deposition head, which are configured to toggle relative to the frame structure along a first axis between a raised position and a lowered position;

an encoded scale retained by the deposition head or the optional moveable receptacle, the encoded scale comprising a reflective component and a non-reflective region offset along the first axis to produce a knife-edge arrangement;

an optical encoder control board retained by the frame structure, and comprising:

a set of at least four light sources configured to emit light rays in a serial manner towards the encoded scale, wherein the reflective component of the encoded scale is configured to reflect at least a portion of the emitted light rays;

a photodetector configured to detect at least a portion of the reflected light rays and to generate signals based on the detected light rays for each of the light sources, wherein the photodetector has a characteristic length along the first axis, and is offset from the encoded scale by a distance that is less than about 300% of the characteristic length; and a controller configured to determine positions of the encoded scale along the first axis based at least in part of the generated signals, wherein the determined positions of the encoded scale correspond to toggle positions of the deposition head along the first axis.

16. The deposition head assembly of claim 15, wherein the characteristic length of the photodetector ranges from about 2.5 millimeters to about 3.8 millimeters.

17. The deposition head assembly of claim 15, wherein the optical encoder control board further comprises a barrier disposed between the set of at least four light sources and the photodetector, the barrier being configured to prevent the light rays emitted from the set of at least four light sources from traveling directly toward the photodetector.

18. The deposition head assembly of claim 15, wherein the reflective surface comprises a specular reflective surface.

19. The deposition head assembly of claim 15, wherein the set of at least four light sources comprises eight light sources.

20. The deposition head assembly of claim 15, wherein the controller is further configured to calibrate the optical encoder control board based on the toggling of the deposition head.

* * * * *